(12) United States Patent
Takeuchi

(10) Patent No.: US 6,879,775 B1
(45) Date of Patent: Apr. 12, 2005

(54) OPTICAL DISC PLAYBACK APPARATUS

(75) Inventor: Katsuyuki Takeuchi, Neyagawa (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 924 days.

(21) Appl. No.: 09/697,133

(22) Filed: Oct. 27, 2000

(30) Foreign Application Priority Data

Dec. 24, 1999 (JP) .............................. 11-366728

(51) Int. Cl.⁷ ........................ H04N 5/85; H04N 7/04
(52) U.S. Cl. ................... 386/126; 386/125; 386/105
(58) Field of Search .......................... 386/126, 125, 386/124, 123, 113, 105, 106, 46, 45, 40, 1, 21, 37, 39, 54; H04N 5/85, 7/04

(56) References Cited

U.S. PATENT DOCUMENTS 5,448,371 A 9/1995 Choi 6,664,970 B1 * 12/2003 Matsushita ................. 345/581

FOREIGN PATENT DOCUMENTS

JP 06-098291 4/1994
JP 11-069251 3/1999

* cited by examiner

Primary Examiner—Robert Chevalier
(74) Attorney, Agent, or Firm—Wenderoth, Lind & Ponack, L.L.P.

(57) ABSTRACT

In an optical disc playback apparatus capable of appropriately setting a font resolution of an on-screen message depending on a display resolution of data to be reproduced from an optical disc, a reader 12, 13, 14, 15 reads record data Si from a recording surface of the optical disc Od. An on-screen message font-resolution selector 16, 1A generates a digital character signal to be displayed as the on-screen message (OSM) An on-screen message font-resolution setting unit 16 controls the on-screen message font-resolution selector 16, 1A to change the font resolution of the on-screen message depending on the display format of the record data.

16 Claims, 15 Drawing Sheets

| NTSC | | | | | |
|---|---|---|---|---|---|
| OD | Vn | Hn | Hn/Vn | Vn/VnV | Hn/HnV |
| VCD | 240 | 352 | 1.47 | 1 | 1 |
| SVCD | 480 | 480 | 1 | 2 | 1.36 |
| DVD | 480 | 720 | 1.5 | 2 | 2.05 |

| PAL | | | | | |
|---|---|---|---|---|---|
| OD | Vp | Hp | Hp/Vp | Vp/VpV | Hp/HpV |
| VCD | 288 | 352 | 1.22 | 1 | 1 |
| SVCD | 576 | 480 | 0.83 | 2 | 1.36 |
| DVD | 576 | 720 | 1.25 | 2 | 2.05 |

OPTICAL DISC PLAYBACK APPARATUS

BACKGROUND OF THE INVENTION

1. Field of the Invention

The present invention relates to optical disc playback apparatuses and, more specifically, to an optical disc playback apparatus for displaying, on a television, an on-screen message in the font having resolution suitable for a type of an optical disc being played back or the display resolution of data recorded thereon.

2. Description of the Background Art

Recently, video CD players which are CD players incorporated with MPEG1 (Moving Picture Coding Experts Group1) decoding feature are widely available. Such video CD players are capable of reproducing images and sounds for maximum of 74 minutes from moving picture data and audio data recorded on video CDs (hereinafter abbreviated as VCDs) and Karaoke CDs, wherein such data is digitally compressed by MPEG1 technique. Further, CVDs (China Video CDs) and SVCDs (Super Video CDs) with higher quality of image and audio data are commercialized especially focusing on Chinese market. The CVDs and the SVCDs are realized with MPEG2 (Moving Picture Coding Experts Group2) digital video decoding feature instead of MPEG1, and can be played back without any modification on mechanism such as optical pickup, servo technique, and signal processing technique for the MPEG1.

Mainly in Japanese and US markets, DVD players incorporated with the MPEG2 decoding feature are commercialized. The DVD players are capable of reproducing maximum of 133 minute high-quality moving pictures with high-resolution defined horizontally by 702 dots and vertically by 480 lines, together with high-quality sound. In addition to the higher quality of reproduced images and sounds, advanced features are achieved in these VCD players and DVD players. Such advanced features are quite convenient for sophisticated users who are familiar with such features to enjoy various functions. On the other hand, for ordinary users, the players and its peripherals achieving such advanced features are difficult to use due to the complicated operation required. To ease the user's inconvenience caused by the complicated operability, the VCD players and DVD players recently adopt an On-Screen Display (hereinafter abbreviated as OSD) function. The function is for displaying information on a monitor for user's easy operation. Such information indicates input information corresponding to user's operation, an elapsed time after start of reproduction, a status of the player during reproduction, a special reproduction function, and a type of optical disc. The displayed information is referred to as an on-screen message (hereinafter abbreviated as OSM).

Hereinafter, by referring to FIGS. 11 and 12, examples of conventional optical disc playback apparatuses are described. In FIG. 11, a first example of the conventional optical disc playback apparatus is shown. In a conventional optical disc playback apparatus OPC1 of this example, an optical disc Od, typically a music CD, is fixedly placed on a spindle motor 72 for rotation. An optical pickup 73 applies a laser beam Lb onto the recording surface of the rotating optical disc Od to read out data therefrom as digital signals.

An optical servo controller 74 executes a servo-control of the spindle motor 72 and the optical pickup 73. A digital signal processor 75 demodulates the digital signals from the optical pickup 73 to convert the signals into sub-code information, control information, a sequence of CD-DA signals unique to the music CD, and a sequence of other signals. Based on the sub-code information and the control information from the digital signal processor 75, a system controller 76 determines the type of the optical disc being played back and detects a system error such as track jump and focus error of the laser beam Lb.

An information signal sequence separator 79 separates the digital signal sequences supplied from the digital signal processor 75 into the CD-DA signal sequence and the signal sequence other than that.

An MPEG decoder 78 receives the CD-DA signal sequence and the signal sequence other than that from the information signal sequence separator 79. The MPEG decoder 78 outputs the received signal sequence as it is by using memory 77 as buffer memory upon receiving the CD-DA signal sequence. On the other hand, if MPEG decoder 78 receives the signal sequence other than the CD-DA signal sequence, the system controller 76 reads sequence header information included in disc information read from the optical disc Od. Based on the sequence header information, the system controller 76 determines a type of the optical disc Od, i.e., VCD, SVCD, or DVD, and further determines whether the video recorded thereon (signal sequence other than the CD-DA signal sequence) is in the PAL format or in the NTSC format.

Further, by using the memory 77 as buffer memory, the MPEG decoder 78 converts the video signal sequence (signal sequence other than the CD-DA signal sequence) in real time into a decoded digital signal sequence. If the system controller 76 determines that the optical disc Od is a VCD, the MPEG decoder 78 decodes the reproduced video signal sequence with MPEG1 technique. If the system controller 76 determines that the optical disc Od is an SVCD or DVD, the MPEG decoder 78 decodes the reproduced video signal sequence with MPEG2 technique. Thereafter, if the video is in the PAL format, the decoded video signal sequence is converted into a decoded digital signal sequence in the PAL format, and if in the NTSC format, into a decoded digital signal sequence in the NTSC format.

In other words, if the video signals recorded on a VCD are in the NTSC format, an image is reproduced in the resolution of 352 dots by 240 lines, and if in the PAL format, in the resolution of 352 dots by 288 lines.

If the video signals recorded on an SVCD are in the NTSC format, an image is reproduced in the resolution of 480 dots by 480 lines, and if in the PAL format, in the resolution of 480 dots by 576 lines.

If the video signals recorded on a DVD are in the NTSC format, an image is reproduced in the resolution of 720 dots by 480 lines, and if in the PAL format, in the resolution of 720 dots by 576 lines.

An on-screen display controller 7A converts character data and character display information read out from the system controller 76 into a digital character signal sequence to display an on-screen message. Font characters of the on-screen message remains unchanged in the resolution of 12 dots by 18 lines regardless of the resolution of the reproduced image.

A video signal D/A converter 7B converts the decoded digital signal sequence from the MPEG decoder 78 and the digital character signal sequence from the on-screen display controller 7A into analog video signals. An audio signal D/A converter 7C converts the CD-DA signal sequence from the MPEG decoder 78 into analog audio signals.

The playback operations of the optical disc playback apparatus OPC1 are described with respect to a music CD and other type of optical disc, respectively. For playing back the music CD, the digital signal processor 75 starts demodulation of the digital signals and then outputs the control information and the sub-code information.

When the system controller 76 determines that the signal sequence is the CD-DA signal sequence based on the control information and the sub-code information, the system controller 76 judges that no video signal sequence is recorded on the optical disc Od. In such case, the system controller 76 transmits a control instruction instructing the digital signal processor 75 to output border color signals (normally blueback) in the NTSC format instead of the video signals. The system controller 76 further outputs the character display information and the character data to the on-screen display controller 7A.

The system controller 76 monitors a system error such as track jump and focus error. Whenever such error occurs, the system controller 76 instructs the optical servo controller 74 so that the optical pickup 73 and the spindle motor 72 return to initial states thereof.

The MPEG decoder 78 receives the CD-DA signal sequence from the digital signal processor 75, and outputs the same by using the memory 77 as buffer memory. The MPEG decoder 78 also converts the border color signals in the NTSC format from the digital signal processor 75 into the decoded digital signal sequence.

The on-screen display controller 7A receives the character display information from the system controller 76, and sets the font character's resolution to 12 dots by 18 lines. The onscreen display controller 7A further receives the character data and converts the same into the digital character signal sequence.

The video signal D/A converter 7B converts the decoded digital signal sequence from the MPEG decoder 78 and the digital character signal sequence from the on-screen display controller 7A into the analog video signals.

The audio signal D/A converter 7C converts the CD-DA signal sequence from the MPEG decoder 78 into the analog audio signals.

Described next is the operation of the optical disc playback apparatus OPC1 for playing back the optical disc Od other than the music CD. For playing back the optical disc Od, the digital signal processor 75 starts demodulation of the digital signals. Then, the digital signal processor 75 outputs the control information and the sub-code information as well as the signal sequence other than the CD-DA signal sequence.

Based on the control information and the sub-code information from the digital signal processor 75, the system controller 76 determines that the signal sequence is other than the CD-DA signal sequence. The system controller 76 also monitors a system error such as track jump and focus error. Whenever such error occurs, the system controller 76 instructs the optical servo controller 74 so that the optical pickup 73 and the spindle motor 72 return to initial states thereof.

The information signal sequence separator 79 separates the digital signal sequences from the digital signal processor 75 into the CD-DA signal sequence and the signal sequence other than that.

The MPEG decoder 78 receives the CD-DA signal sequence and the signal sequence other than that from the information signal sequence separator 79. The MPEG1 decoder 78 converts, in real time, the video signal sequence into the decoded digital signal sequence in the PAL format if the video recorded on the optical disc Od is in the PAL format, and in the NTSC format if in the NTSC format.

The on-screen display controller 7A receives the character display information and the character data from the system controller 76, and converts the character data into the digital character signal sequence to display the on-screen message in the font character of 12 dots by 18 lines.

The video signal D/A converter 7B converts the decoded digital signal sequence from the MPEG decoder 78 and the digital character signal sequence from the on-screen display controller 7A into the analog video signals.

The audio signal D/A converter converts the CD-DA signal sequence from the MPEG decoder 78 into the analog audio signals.

Next, in FIG. 12, a second example of the conventional optical disc playback apparatus is shown. An optical disc playback apparatus OPC2 of the example includes an MPEG decoder 88, in which the MPEG decoder 78 and the on-screen display controller 7A of the optical disc playback apparatus OPC1 shown in FIG. 11 are integrally constructed.

Consequently, the MPEG decoder 88 converts the character display information and the character data from the system controller 76 into the digital character signal sequence. Further, the MPEG decoder 88 can output the converted digital character signal sequence together with the decoded digital signal sequence. Since the operation of the optical disc playback apparatus OPC2 for playing back the optical disc Od is basically the same as that of the optical disc playback apparatus OPC1 except for the above described operation related to the MPEG decoder 88, the description thereof is omitted herein.

As described above, the resolution of television images differ from each other depending on the image data sources and display formats of images recorded thereon. Such differences are described by referring to FIGS. 13, 14, 15, 16, and 17.

In FIG. 13, V and H denote vertical and horizontal resolutions of a television image, respectively. For the sake of distinction, the vertical resolution V and the horizontal resolution H are each provided with a suffix p if the image is in the PAL format and provided with a suffix n if in the NTSC format.

In FIG. 14, with respect to the image in the NTSC format, a resolution and an aspect ratio thereof are shown for each type of optical discs. In FIG. 14, a column OD on the far left end shows types of optical disc, i.e., VCD, SVCD, and DVD. The next column Vn on the right shows the vertical resolutions of images recorded on VCD, SVCD, and DVD, respectively. The vertical resolution Vn of the image on VCD is provided with a suffix V if distinction is required. Similarly, the vertical resolutions Vn of images on SVCD and DVD are provided with suffixes S and D, respectively.

The next column Hn on the right shows the horizontal resolutions of the images recorded on VCD, SVCD, and DVD, respectively. Similarly to the column Vn, the horizontal resolutions Hn of the images on VCD, SVCD, and DVD are respectively provided with suffixes V, S, and D if distinction is required.

The next column Hn/Vn on the right shows the aspect ratios of the images for each type of optical disc. The aspect ratios are shown in numbers rounded off to two decimal places.

The next column Vn/VnV on the right shows the ratios between the vertical resolution VnV of VCD and the vertical resolution Vn of each type optical disc (VnV, VnS, VnD). The ratios are shown in numbers rounded off to two decimal places.

The next column Hn/HnV on the right shows the ratios between the horizontal resolution HnV of VCD and the horizontal resolution Hn of each type optical disc (VnV, VnS, VnD). The ratios are shown in numbers rounded off to two decimal places.

As is shown in FIG. 14, the vertical resolution VnV of the NTSC image on the VCD is 240 lines, the horizontal resolution HnV thereof is 352 dots, and the aspect ratio HnV/VnV thereof is 1.47.

The vertical resolution VnS of the image on the SVCD is 480 lines, the horizontal resolution HnS thereof is 480 dots, and the aspect ratio HnS/VnS thereof is 1. Further, the vertical resolution ratio VnS/VnV=480/240 is 2, and the horizontal resolution ratio HnS/HnV=480/352 is 1.36.

The vertical resolution VnD of the image on the DVD is 480 lines, the horizontal resolution HnD thereof is 720 dots, and the aspect ratio HnD/VnD thereof is 1.5. Further, the vertical resolution ratio VnD/VnV=480/240 is 2, and the horizontal resolution ratio HnD/HnV=720/352 is 2.05.

In FIG. 15, with respect to the image in the PAL format, a resolution and an aspect ratio thereof are shown for each type of optical discs in the similar manner to FIG. 14. In FIG. 15, a column OD on the far left end shows types of optical disc, i.e., VCD, SVCD, and DVD.

The vertical resolution VpV of the PAL image on the VCD is 288 lines, the horizontal resolution HpV thereof is 352 dots, and the aspect ratio HpV/VpV thereof is 1.22.

The vertical resolution VpS of the image on the SVCD is 576 lines, the horizontal resolution HpS thereof is 480 dots, and the aspect ratio HpS/VpS thereof is 0.83. Further, the vertical resolution ratio VpS/VpV=576/288 is 2, and the horizontal resolution ratio HpS/HpV=480/352 is 1.36.

The vertical resolution VpD of the image on the DVD is 576 lines, the horizontal resolution HpD thereof is 720 dots, and the aspect ratio HpD/VpD thereof is 1.25. Further, the vertical resolution ratio VpD/VpV=576/288 is 2, and the horizontal resolution ratio HpD/HpV=720/352 is 2.05.

In FIGS. 16A to 16C, the resolutions, the aspect ratios, and the resolution ratios of the NTSC image in FIG. 14 are relationally shown. In the drawings, screen displays of images are schematically shown for each type of the optical discs. All images are being displayed on the same television monitor and are equal in the vertical image size. On the right side of screen displays, font characters Fn exemplarily displayed in "◊" are shown. The font characters Fn are all in the resolution of vertically 18 lines and horizontally 12 dots, and are shown in the same up-scaling ratio. For the sake of brevity, hereinafter, "font character" is simply referred to as "font", unless otherwise distinction is required therebetween.

In FIG. 16A, a screen display SnV of the NTSC image recorded on the VCD (hereinafter, "NTSC-VCD image screen SnV") and a font FnV displayed thereon as "◊" are shown. The aspect ratio of the font FnV is approximately 0.67 (12/18) and the aspect ratio HnV/VnV of the NTSC-VCD image screen SnV is 1.47.

Next, as shown in FIG. 16B, with respect to a screen display SnS of the image recorded on the SVCD (hereinafter, "NTSC-SVCD image screen SnS"), the aspect ratio HnS/VnS is 1. The vertical resolution ratio VnS/VnV of the NTSC-SVCD image screen SnS to the NTSC-VCD image screen SnV is 2 and the horizontal resolution ratio HnS/HnV is 1.36.

For each of the images displayed on a television monitor in different resolutions, the vertical and horizontal spaces between the dots are so determined that all images are equal in size in vertical direction. As a result, in comparison with the font FnV, a font FnS displayed on the NTSC-SVCD image screen SnS in 12 dots by 18 lines is shrunk by ½ (240/480) times vertically and by ¹⁄₁.₃₆ (352/480) times horizontally. The aspect ratio of the font FnS displayed on the NTSC-SVCD image screen SnS is therefore approximately 0.98 (12/18·480/240·352/480).

As such, the font Fn indicating "◊" is displayed differently on the NTSC-VCD image screen SnV (FnV) and on the NTSC-SVCD image screen SnS (FnS). That is to say, on the NTSC-SVCD image screen SnS, the font Fn is shrunk in size and the aspect ratio thereof is varied from approximately 0.67 to 0.98, resulting in deformation. Also, the size of the font FnS is approximately ½.₇ times smaller than the font FnV.

Next, as shown in FIG. 16C, with respect to a screen display SnD of the image recorded on the DVD (hereinafter, "NTSC-DVD image screen SnD"), the aspect ratio HnD/VnD is 1.5. The vertical resolution ratio VnD/VnV of the NTSC-DVD image screen SnD to the NTSC-VCD image screen SnV is 2 and the horizontal resolution ratio HnD/HnV is 2.05.

As a result, in comparison with the font FnV, a font FnD displayed on the NTSC-DVD image screen SnV in 12 dots by 18 lines is shrunk by ½ (240/480) times vertically and by ¹⁄₂.₀₅ (352/720) times horizontally. The aspect ratio of the font FnD displayed on the NTSC-DVD image screen SnD is therefore approximately 0.65 (12/18·480/240·352/720).

As such, the font Fn indicating "◊" is displayed differently on the NTSC-VCD image screen SnV (FnV) and on the NTSC-DVD image screen SnD (FnD). That is to say, on the NTSC-DVD image screen SnD, the font Fn is shrunk in size and the aspect ratio thereof is varied from approximately 0.67 to 0.64. In this case, deformation of the font Fn is not a great concern, but the size of the font FnD is approximately ¼ times smaller than the font FnV.

In FIGS. 17A to 17C, the resolutions, the aspect ratios, and the resolution ratios of the PAL image in FIG. 15 are relationally shown. In the drawings, similarly to FIGS. 16A to 16C, screen displays of images are schematically shown for each type of the optical discs. All images are being displayed on the same television monitor and are equal in the vertical image size. On the right side of screen displays, fonts Fp exemplarily displayed in "◊" are shown. The fonts Fp are all in the resolution of vertically 18 lines and horizontally 12 dots, and are shown in the same up-scaling ratio.

In FIG. 17A, a screen display SpV of the PAL image recorded on the VCD (hereinafter, "PAL-VCD image screen SpV") and a font FpV displayed thereon as "◊" are shown. The aspect ratio of the font FpV is also approximately 0.67 (12/18) and the aspect ratio HpV/VpV of the PAL-VCD image screen SpV is 1.22.

Next, as shown in FIG. 17B, with respect to a screen display SpS of the image recorded on the SVCD (hereinafter, "PAL-SVCD image screen SpS"), the aspect ratio HpS/VpS is 0.83. The vertical resolution ratio VpS/VpV of the PAL-SVCD image screen SpS to the PAL-VCD image screen SpV is 2 and the horizontal resolution ratio HpS/HpV is 1.36.

As a result, in comparison with the font FpV, a font FpS displayed on the PAL-SVCD image screen SpS in 12 dots by 18 lines is shrunk by ½ (288/576) times vertically and by ¹⁄₁.₃₆ (352/480) times horizontally. The aspect ratio of the font FpS displayed on the PAL-SVCD image screen SpS is therefore approximately 0.97 (12/18·576/288·352/480).

As such, the font Fp indicating "◇" is displayed differently on the PAL-VCD image screen SpV (FpV) and on the PAL-SVCD image screen SpS (FpS). That is to say, on the PAL-SVCD image screen SpS, the size of the font FpS is approximately 1/2.72 times smaller than the font FpV, and the aspect ratio of the font Fp is varied from approximately 0.67 to 0.97, resulting in deformation.

Next, as shown in FIG. 17C, with respect to a screen display SpD of the image recorded on the DVD (hereinafter, "PAL-DVD image screen SpD"), the aspect ratio HnD/VnD is 1.25. The vertical resolution ratio VpD/VpV of the PAL-DVD image screen SpD to the PAL-VCD image screen SpV is 2 and the horizontal resolution ratio HpD/HpV is 2.05.

As a result, in comparison with the font FpV, a font FpD displayed on the PAL-DVD image screen SpD in 12 dots by 18 lines is shrunk by ½ (288/576) times vertically and by ½.05 (352/720) times horizontally. The aspect ratio of the font FpD displayed on the PAL-DVD image screen SpD is therefore approximately 0.65 (12/18·576/288·352/720).

As such, the aspect ratio of the font Fp indicating "◇" is varied from approximately 0.67 to approximately 0.65 between the cases of being displayed on the PAL-VCD image screen SpV (FpV) and on the PAL-DVD image screen SpD (FpD). In this case, deformation of the font Fp is not a great concern, but the size of the font FpD is approximately 1/4.1 times smaller than the font FpV.

As described above, in the conventional optical disc playback apparatus OPC, the resolution remains unchanged for the font indicating characters and symbols displayed as the on-screen message although the resolution of the image on the television varies depending on the disc type or the display format. As a result, with increasing resolution of the television image, the font is shrunk and deformed, and visibility of the on-screen message is considerably impaired.

To be specific, in the conventional optical disc playback apparatus OPC, the font of the on-screen message remains unchanged in low resolution of 12 dots by 18 lines whether the reproduced image is high or low in resolution. Therefore, the problem comes up that if the reproduced image in high-resolution, the on-screen message is apparently displayed in smaller size and impaired in its visibility. Further, the number of pixels composing the font of the on-screen message is small. Therefore, another problem comes up that Chinese characters and symbols in high-resolution can not be displayed. Still further, in the future, further an increase in the resolution of various types of reproduced images is expected with an increase in television image resolution and progression of digital compression technique for moving pictures. The font resolution of the on-screen message therefore will need improvement more than ever.

The present invention aims to solve the problems discussed above and to provide an optical disc playback apparatus for displaying an on-screen message such that each font is displayed in high-visibility without much change in size and form regardless of the resolution of the image. When a VCD, Karaoke CD, SVCD (including CVD), or DVD is played back, information recorded thereon and an image display format of data being reproduced are determined. Based on the determination, the on-screen message is displayed in the font having resolution suitably selected for a type of an optical disc or a resolution of an image.

SUMMARY OF THE INVENTION

A first aspect of the present invention is directed to an optical disc playback apparatus for reproducing data from a plurality kinds of optical discs with data recorded thereon in different display formats and outputting an on-screen message composed of a font character (hereinafter referred to as font). The apparatus in accordance with the first aspect of the present invention comprises a reader for reading recorded data from a recording surface of the optical disc; an on-screen message generator for generating a digital character signal sequence to be displayed as the on-screen message; and an on-screen message font-resolution setting unit for controlling the on-screen message generator to set a resolution of the font to a value appropriate for the display format indicated by the recorded data.

As described above, in the first aspect, even when images varied in display format are displayed on the same display, visibility of the on-screen message can be secured by appropriately setting the resolution of the font composing the on-screen message.

According to a second aspect, in the first aspect, the apparatus further comprises an optical disc determination unit for determining a type of the optical disc based on the read recorded data, wherein the on-screen message font-resolution setting unit controls the on-screen message generator to set the resolution of the font to 12 dots by 18 lines when the optical disc is determined to be a music CD.

According to a third aspect, in the second aspect, the apparatus further comprises a display format determination unit for determining a display format of the data to be reproduced based on the read recorded data, wherein the on-screen message font-resolution setting unit controls the on-screen message generator to set the resolution of the font to a first standard resolution when the optical disc is determined to be a disc other than the music CD and when the display format of the data to be reproduced is determined as NTSC.

According to a fourth aspect, in the third aspect, the on-screen message font-resolution setting unit controls the on-screen message generator to set the resolution of the font to a second standard resolution by multiplying the first standard resolution by a predetermined scaling factor when the optical disc is determined to be a disc other than the music CD and when the display format of the data to be reproduced is determined to be PAL.

As described above, in the fourth aspect, only one type of the font in the standard resolution is required for both of the NTSC format and the PAL format that differ in resolution.

According to a fifth aspect, in the fourth aspect, the predetermined scaling factor is 1.2.

According to a sixth aspect, in the third aspect, the first standard resolution is set to 12 dots by 18 lines when the optical disc is determined to be a video CD.

According to a seventh aspect, in the third aspect, the first standard resolution is set to 24 dots by 24 lines when the optical disc is determined to be any one of an SVCD or DVD.

According to an eighth aspect, in the second aspect, the apparatus further comprises a display format determination unit for determining a display format of the data to be reproduced based on the recorded data, wherein the on-screen message font-resolution setting unit controls the on-screen message generator to set the resolution of the font to a predetermined standard resolution when the optical disc is determined to be a disc other than the music CD and when the display format of the data to be reproduced is determined to be PAL.

According to a ninth aspect, in the eighth aspect, the predetermined standard resolution is set to 12 dots by 21 lines when the optical disc is determined to be a video CD.

According to a tenth aspect, in the eighth aspect, the predetermined standard resolution is set to 24 dots by 28 lines when the optical disc is determined as to be any one of an SVCD or DVD.

According to an eleventh aspect, in the second aspect, the optical disc determination unit determines the type of the optical disc based on a control bit of a TOC included in the recorded data.

According to a twelfth aspect, in the eighth aspect, the display format determination unit determines the display format of the data to be reproduced based on a sequence header included in the recorded data.

According to a thirteenth aspect, in the first aspect, the apparatus further comprises a signal sequence separator for separating a first music CD signal sequence and a non-music CD signal sequence which is a signal sequence other than the first music CD signal sequence, from the recorded data; a digital signal processor for converting video signals included in the separated non-music CD signal sequence into a decoded digital signal sequence and converting audio data included in the non-music CD signal sequence to a second music CD signal sequence; a video signal converter for converting the decoded digital signal sequence and the digital character signal sequence into analog video signals; and an audio signal converter for converting the first music CD signal sequence and the second music CD signal sequence into analog audio signals.

According to a fourteenth aspect, in the thirteenth aspect, the digital signal processor is capable of decoding an MPEG1 signal sequence.

According to a fifteenth aspect, in the thirteenth aspect, the digital signal processor is capable of decoding an MPEG2 signal sequence.

A sixteenth aspect of the present invention is directed to an optical disc playback method for reproducing data recorded on an optical disc and outputting an on-screen message to be displayed in a font character of a predetermined resolution. The method in accordance with the sixteenth aspect of the present invention comprises reading recorded data from a recording surface of the optical disc: generating a digital character signal sequence to be displayed as the on-screen message; and setting a resolution of the font character based on the read recorded data.

These and other objects, features, aspects and advantages of the present invention will become more apparent from the following detailed description of the present invention when taken in conjunction with the accompanying drawings.

DESCRIPTION OF THE PREFERRED EMBODIMENT

First, by referring to FIGS. 1 to 6, an optical disc playback apparatus according to a first embodiment of the present invention is described. Thereafter, by referring to FIGS. 7 and 8, and further by referring to FIGS. 9 and 10, optical disc playback apparatuses according to a second and a third embodiments of the present invention are described, respectively.

(First Embodiment)

Figure 1:
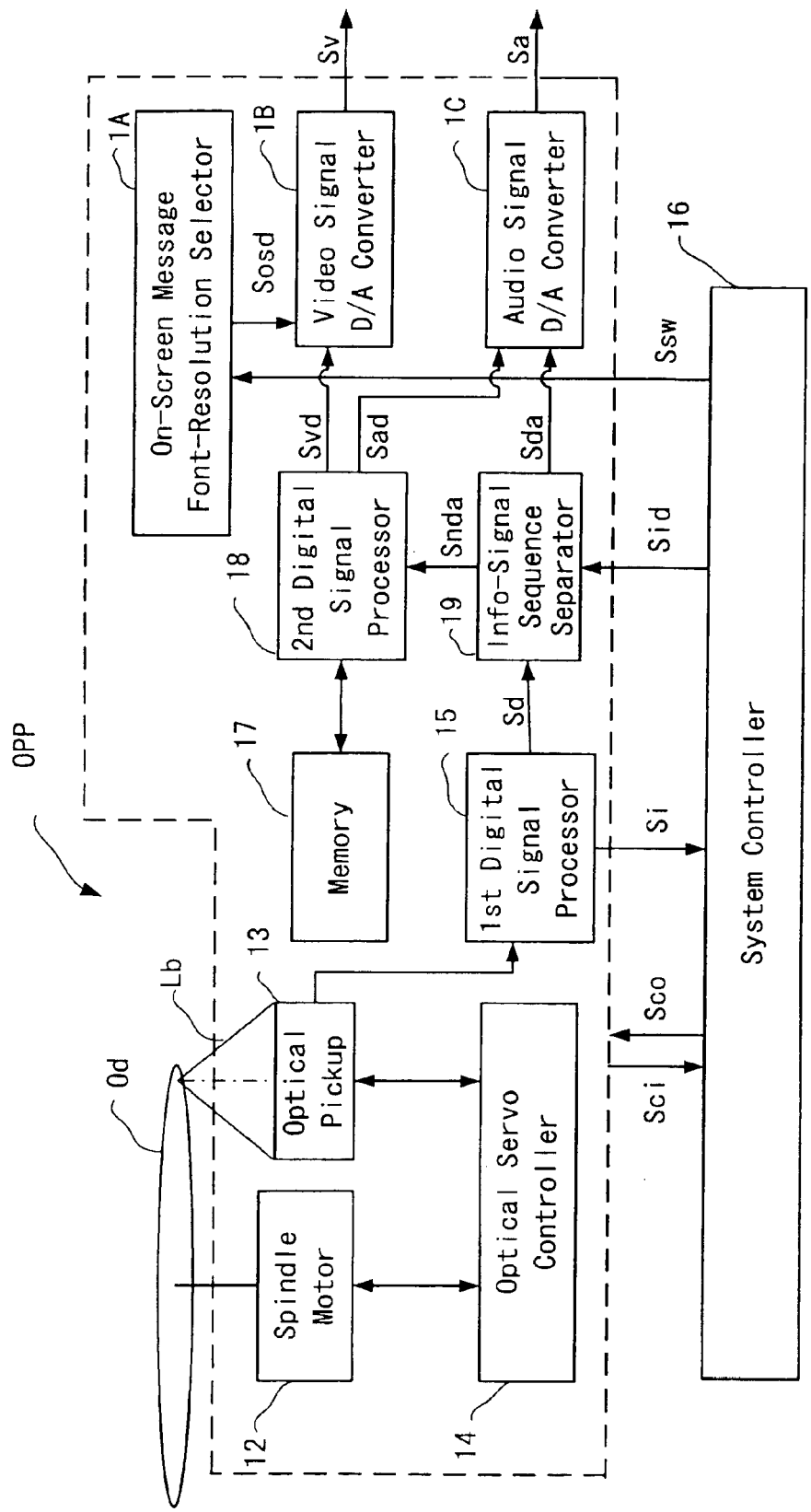
FIG. 1 is a block diagram showing the structure of an optical disc playback apparatus according to a first embodiment of the present invention.

An optical disc playback apparatus OPP according to the first embodiment of the present invention is described by referring to FIG. 1. The optical disc playback apparatus OPP includes a spindle motor 12, an optical pickup 13, an optical servo controller 14, a first digital signal processor 15, a system controller 16, memory 17, a second digital signal processor 18, an information signal sequence separator 19, an on-screen message (OSM) font-resolution selector 1A, a video signal D/A converter 1B, and an audio signal D/A converter IC.

The spindle motor 12 fixes an optical disc Od to be played back on itself, and rotates the fixed disc. The optical pickup 13 applies a laser beam Lb onto the recording surface of the optical disc Od being rotated on the spindle motor 12, and then receives the laser beam Lb reflected by the recording surface to read data recorded thereon as digital signals. The optical servo controller 14 executes a servo-control of the spindle motor 12 and the optical pickup 13. The optical servo controller 14 generates a servo operation signal indicating servo operation, and outputs the same to the system controller 16.

The first digital signal processor 15 demodulates the digital signals from the optical pickup 13 to convert the same into sub-code information, control information, a CD-DA signal sequence unique to a music CD, and a signal sequence other than that. The first digital signal processor 15 then outputs the sub-code information and the control information to the system controller 16 as an information signal Si. The first digital signal processor 15 also outputs the CD-DA signal sequence and the signal sequence other than that as decoded signal sequences Sd to the information signal sequence separator 19.

Note that, hereinafter in the specification, the CD-DA signal sequence and the signal sequence other than that are referred to as a music CD signal sequence Sda and a non-music CD signal sequence Snda, respectively. The non-music signal sequence Snda includes the decoded signal sequence Sd read out from a video CD on which video data and audio data are recorded as combined data, for example.

Based on the information signal Si from the first digital signal processor 15, the system controller 16 determines whether the decoded signal sequence Sd currently being outputted from the first digital signal processor 15 is the music CD signal sequence Sda or the non-music CD signal sequence Snda. Based on the determination, the system controller 16 generates a determination instruction Sid and a control signal Ssw. The determination instruction Sid is supplied to the information signal sequence separator 19 and the control signal Ssw is supplied to the OSM font-resolution selector 1A.

The system controller 16 detects system errors such as track jumps or focus errors of the laser beam LB based on the servo operation signal from the optical servo controller 14, and feed-back controls the optical servo controller 14. Further, the system controller 16 generates a control signal Sco based on a processing signal Sci for entirely controlling the operation of the optical disc playback apparatus OPP. The processing signal Sci includes the above mentioned input signal, and is supplied from each component in the optical disc playback apparatus OPP. Such control method is a known technique, and therefore, the description thereof is omitted herein.

Based on the determination instruction Sid from the system controller 16, the information signal sequence separator 19 outputs the signal sequence included in the decoded signal sequence Sd from the first digital signal processor 15. The music CD signal sequence Sda is outputted to the audio signal D/A converter 1C. The non-music CD signal sequence Snda is outputted to the second digital signal processor 18.

Based on the instruction (Sco) from the system controller 16, the second digital signal processor 18 converts, in real time, the non-music CD signal sequence Snda from the information signal sequence separator 19 into a decoded digital signal sequence Svd and a CD-DA signal sequence Sad, by using the memory 17 as buffer memory. The second digital signal processor 18 outputs the decoded digital signal sequence Svd, which is composed of video signals, to the video signal D/A converter 1B. The second digital signal processor 18 also outputs the CD-DA signal sequence Sad, which is composed of audio signals, to the audio signal D/A converter IC.

The OSM font-resolution selector 1A sets a resolution of a font F for an on-screen message to be displayed on the television screen, based on the control signal Ssw from the system controller 16. The OSM font-resolution selector 1A then outputs a digital character signal sequence Sosd indicating the on-screen message to the video signal D/A converter 1B. The on-screen message will be displayed in the font F having the set resolution.

In detail, the on-screen message is in a font FnVr having the resolution of 12 dots by 18 lines for the NTSC-VCD image screen SnV in the resolution of 352 dots by 240 lines. On the other hand, the on-screen message is in a font FpVr having the resolution of 12 dots by 21 lines for the PAL-VCD image screen SpV in the resolution of 352 dots by 288 lines.

Such difference in font resolution is for keeping the aspect ratio of the font FpVr the same as that of the font FnVr, considering the fact that the PAL format adopts approximately 1.2 (288/240) times higher resolution (scanning lines) than the NTSC format in horizontal direction.

Similarly, the on-screen message is in a font FnSr having the resolution of 24 dots by 24 lines for the NTSC-SVCD image screen SnS in the resolution of 480 dots by 480 lines. On the other hand, the on-screen message is in a font FpSr having the resolution of 24 dots by 28 lines for the PAL-SVCD image screen SpS in the resolution of 480 dots by 576 lines.

Further, the on-screen message is in a font FnDr having the resolution of 24 dots by 24 lines for the NTSC-DVD image screen SnD in the resolution of 720 dots by 480 lines. On the other hand, the on-screen message is in a font FpDr having the resolution of 24 dots by 28 lines for the PAL-DVD image screen SpD in the resolution of 720 dots by 576 lines.

With respect to the music CD signal sequence Sda, no video signal is recorded on the optical disc. Therefore, the OSM font-resolution selector 1A sets the resolution of the font F to 12 dots by 18 lines. The above described resolutions set for each of the fonts F, including that for the music CD signal sequence Sda, are only an example and may be set at will.

Further, a predetermined types of fonts F varied in resolution may be previously stored in a ROM or the like, and then the one that matches the setting may be read out therefrom. Alternatively, a font Fs having the standard resolution may be stored in the ROM, and the font F in any resolution may be generated from the font Fs through processing. Although the latter is adopted in the embodiment, the former may also be adopted.

The video signal D/A converter 1B converts both the decoded digital signal sequence Svd from the second digital signal processor 18 and the digital character signal sequence Sosd from the OSM font-resolution selector 1A to analog video signals Sv.

The audio signal D/A converter 1C converts the separated CD-DA signal sequence Sda from the information signal sequence separator 19 and the CD-DA signal sequence Sad from the second digital signal processor 18 into analog audio signals Sa.

Figure 2:
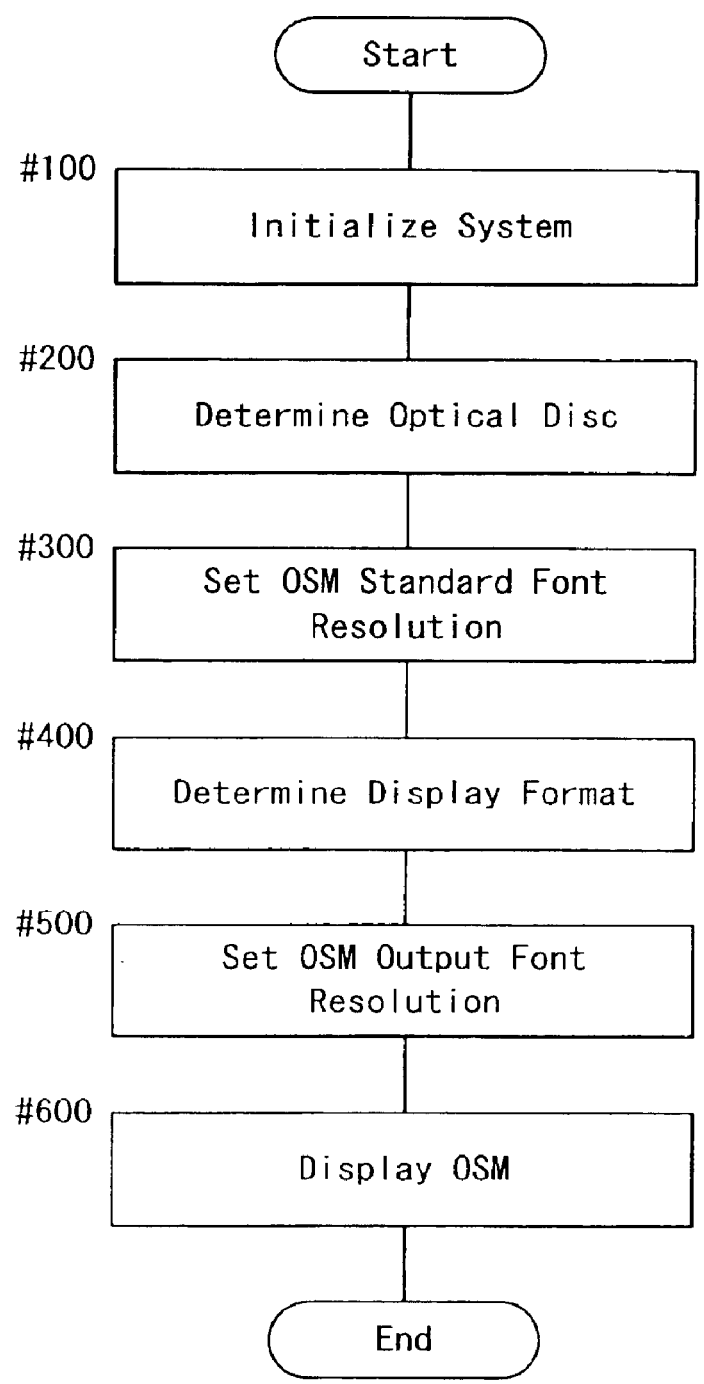
FIG. 2 is a flowchart showing the main operation of the optical disc playback apparatus in FIG. 1.
Figure 3:
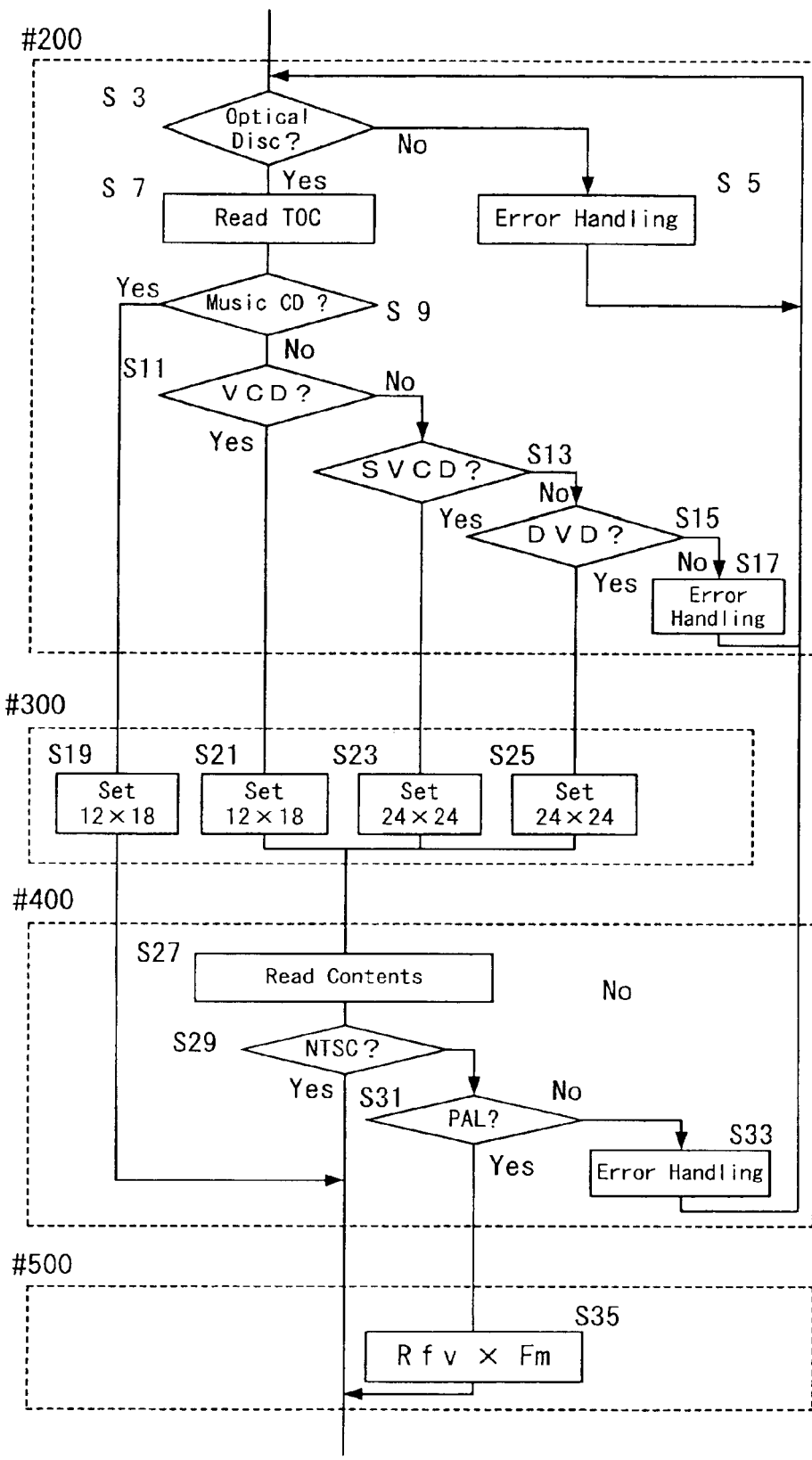
FIG. 3 is a flowchart showing main subroutines in the flowchart of FIG. 2 in detail.

By referring to flowcharts in FIGS. 2 and 3, described is the operation for setting the font resolution of the on-screen message in the optical disc playback apparatus OPP structured as above.

In FIG. 2, the flowchart of the main operation of the optical disc playback apparatus OPP is shown. The optical disc playback apparatus OPP is turned ON to start the operation. First, in a system initialization subroutine of step #100, the optical disc playback apparatus OPP is entirely initialized, and then the procedure goes to a next step #200.

In an optical disc determination subroutine of step #200, the type of the optical disc Od set in the optical disc playback apparatus OPP is determined. In the embodiment, the optical disc Od is determined as any one of the music CD, VCD, SVCD (CVD), or DVD. The determination can be surely made on an arbitrary type of the future optical disc Od that records digital information thereon, with only an easy change in the structure. Then the procedure advances to a next step #300.

In an OSM standard-font-resolution setting subroutine of step #300, the standard font resolution is set for each type of the optical discs Od determined in step #200. In the embodiment, the font resolution for the image in the NTSC format is set as the standard. That means, the font Fs in the standard resolution of 12 dots by 18 lines is set if the optical disc is determined to be a music CD. The font FnVr in the standard resolution of 12 dots by 18 lines is set if the optical disc is determined to be a VCD. The font FnSr and the font FnDr both in the standard resolution of 24 dots by 24 lines are set if the optical disc is determined to be an SVCD or DVD, respectively. As is described above, the standard resolution may be set differently from the above. The procedure then advances to a next step #400.

In a display format determination subroutine of step #400, determined is the display format of an image to be reproduced from ach type of the optical disc Od (music CD, VCD, SVCD, DVD) determined in step #200. The procedure then advances to a next step #500.

In an OSM output-font-resolution setting subroutine of step #500, the standard resolution is appropriately corrected based on the display format determined in step #400, and then the font resolution of the on-screen message is finally determined.

In an OSM display subroutine of step #600, the on-screen message is displayed with the font in the resolution determined in the above described manner.

Next, by referring to FIG. 3, the procedure in the above described subroutines #200, #300, #400, and #500 is described in detail. After the system initialization of the optical disc playback apparatus OPP in step #100, the optical disc determination subroutine of step #200 is started. [#200]

In step S3, it is judged whether the optical disc Od is set or not. If determined No, the procedure advances to step S5.

In step S5, error handling such as prompting a user to set the optical disc Od is performed. In detail, under the control of the system controller 16, a display (not shown) provided on the optical disc playback apparatus OPP shows that the optical disc Od is not set. Then, the procedure returns to step S3 and waits for the optical disc Od to be set.

On the other hand, if determined Yes in step S3, meaning that the optical disc Od is set, the procedure goes to step S7.

In step S7, the laser beam Lb is applied onto the optical disc Od to start data reproduction. First, a control bit in a TOC (Table of Contents) of the optical disc Od is read as the information signal Si. The procedure then advances to a next step S9.

In step S9, the system controller 16 determines whether or not the optical disc Od being played back is a music CD, based on the control bit (information signal Si) read in step S7. If a value of the control bit represented by the information signal Si outputted from the first digital signal processor 15 indicates that the optical disc Od is a music CD, the procedure advances to step S19 in the OSM standard-font-resolution setting subroutine #300.

On the other hand, if determined No in step S9, meaning that the optical disc Od being played back is not a music CD, the procedure advances to step S11.

In step S11, as is done in step S9, it is determined whether or not the optical disc Od being played back is a VCD, based on the information signal Si (control bit). If Yes, meaning that the optical disc Od is determined as to be a VCD, the procedure advances to step S21 in the OSM standard-font-resolution setting subroutine #300. If determined No, meaning that the optical disc Od is not a VCD, the procedure goes to step S13.

In step S13, as is done in steps S9 and S11, it is determined whether or not the optical disc Od being played back is a SVCD. If Yes, the procedure advances to step S23 in the OSM standard-font-resolution setting subroutine #300. If No, the procedure goes to step S15.

In step S15, as is done in steps S9, S11, and S13, it is determined whether or not the optical disc Od being played back is a DVD. If Yes, the procedure advances to step S25 in the OSM standard-font-resolution setting subroutine #300. If No, meaning that the optical disc Od being played back is not any one of a music CD, VCD, SVCD, and DVD, the procedure goes to step S17.

In step S17, error handling such as prompting a user to set an appropriate optical disc Od is performed. In detail, under the control of the system controller 16, the display (not shown) provided on the optical disc playback apparatus OPP shows that the optical disc Od being set is not supported (playable) by the optical disc playback apparatus OPP, i.e., not being any one of the music CD, VCD, SVCD, and DVD. Then, the procedure returns to step S3 and waits for an appropriate optical disc Od to be set.

Note, in the embodiment, the music CD, VCD, SVCD, and DVD are exemplified as the possible optical discs Od to be played back. It is needless to say, however, the optical disc playback apparatus OPP can playback an arbitrary type of the optical disc Od by implementing the above described second digital signal processor 18 as a digital processor suitable for reproducing data on such optical disc Od. [#300]

If it is determined in the above step S9 that a music CD is being played back, in step S19, 12 dots by 18 lines defined for the NTSC format is set as the standard font resolution of the on-screen message. The procedure then advances to the display format determination subroutine #400, the OSM output-font-resolution setting subroutine #500, and then to the OSM display subroutine #600.

If it is determined in the above step S11 that a VCD is being played back, in step S21, 12 dots by 18 lines defined for the NTSC format is set as the standard font resolution of the on-screen message. The procedure then advances to step S27 in the display format determination subroutine #400.

As such, in the embodiment, the font resolution of the on-screen message is set as 12 dots by 18 lines if the optical disc Od is a music CD or a VCD. It is needless to say, however, that the font resolution may be set differently.

If it is determined in the above step S13 that a SVCD is being played back, in step S23, 24 dots by 24 lines defined for the NTSC format is set as the standard font resolution of the on-screen message. The procedure then advances to step S27 in the display format determination subroutine #400.

If it is determined in the above step S15 that a DVD is being played back, in step S25, 24 dots by 24 lines defined for the NTSC format is set as the standard font resolution of the on-screen message. The procedure then advances to step S27 in the display format determination subroutine #400.

As such, in the embodiment, the font resolution of the on-screen message is set as 24 dots by 24 lines if the optical disc Od is a SVCD or a DVD. It is needless to say, however, that the font resolution may be set differently.
[#400]

After the OSM standard-font-resolution setting subroutine #300 in which the font resolution defined for the NTSC format is set for each type of the optical discs, in step S27, contents are read out from the optical disc Od. Then, the procedure advances to a next step S29.

In step S29, it is determined whether or not the image to be reproduced is in the NTSC format, based on the contents (sequence header) read in step S27. If Yes, the procedure advances the OSM output-font-resolution setting subroutine #500. If No, the procedure advances to a next step S31.

In step S31, it is determined whether or not the image to be reproduced is in the PAL format. If Yes, the procedure advances the OSM output-font-resolution setting subroutine #500. If No, the procedure advances to a next step S33.

In step S33, error handling such as prompting a user to set an appropriate optical disc Od is performed by displaying that the display format of the reproduced image is not in the adaptable format, i.e., the NTSC or the PAL. Then, the procedure returns to step S3 and waits for an appropriate optical disc Od to be set.

[#500]

If the NTSC is determined for the reproduced image in step S29, the procedure advances to the OSM display subroutine #600. Then, the on-screen message is displayed with the font in the standard resolution, i.e., FnVr, FnSr, or FnDr, which is set in the OSM standard font resolution setting subroutine #300.

On the other hand, if the PAL is determined for the reproduced image in step S31, in step S35, the standard resolution set in the OSM standard font resolution setting subroutine #300 is reset to the resolution suitable for the PAL image. In detail, a vertical standard font resolution RVf defined for the NTSC format is multiplied by an arbitrary scaling factor Fm.

In this embodiment, the vertical resolution of the PAL image is approximately 1.2 times higher than the NTSC image. Therefore, the standard font resolution RVf is multiplied by a scaling factor of 1.2, and reset as the standard font resolution for the PAL format. Herein, a horizontal resolution RHf may also be reset, as required. In this manner, the font FpVr, FpSr, or FpDr is outputted as the font in the suitable resolution for the PAL image.

Note that the scaling factor Fm is not limited to 1.2 and can be set arbitrarily for each type and/or display format of the optical disc Od.

Further, the vertical resolution RVf or the horizontal resolution RHf may be set to a predetermined value depending on the type and the display format of the optical disc Od without being multiplied by the arbitrary scaling factor Fm.

Still further, the scaling factor Fm may be set as 1. In such case, the font resolution of the on-screen message is set as the same for the NTSC image and the PAL image as long as the type of the optical disc Od is the same. The OSM output-font resolution setting subroutine #500 is therefore omissible.

As described in the foregoing, in the optical disc playback apparatus OPP of the embodiment, the information signal Si and the decoded signal sequence Sd are generated through demodulation of the digital signals read from the optical disc Od. Based on the sub-code information included in the information signal Si, determination is made on whether or not the decoded signal sequence Sd is the CD-DA signal sequence, which is a basic format of a compact disc, or the signal sequence other than that.

If the decoded signal sequence Sd is determined as the CD-DA signal sequence, no video signal is recorded on the optical disc Od, and therefore the font resolution of the on-screen message is set to 12 dots by 18 lines. If the decoded signal sequence Sd is determined as the signal sequence other than the CD-DA signal, the type of the optical disc Od, i.e., VCD, SVCD, or DVD, is further determined, based on the sequence header included in the information signal Si. The font resolution of the on-screen message is set to 12 dots by 18 lines for the VCD in the NTSC format, and to 24 dots by 24 lines for the SVCD or DVD in the NTSC format. The font resolution is set to 12 dots by 21 lines for the VCD in the PAL format, and to 24 dots by 28 lines for the SVCD or DVD in the PAL format.

Further, the decoded signal sequence Sd is separated into the CD-DA signal sequence and the signal sequence other than that. The signal sequence other than the CD-DA signal is then converted in real time, into the decoded digital signal sequence Svd and the CD-DA signal sequence Sad.

The digital character signal sequence Sosd for the on-screen display and the decoded digital signal sequence Svd are both converted into the analog video signals Sv.

The CD-DA signal sequences Sda and Sad are both converted into the analog audio signals Sa.

As described above, when a VCD, SVCD (CVD), or DVD is played back, optical disc information thereof is determined. According to the determination, the font resolution of the on-screen message is suitably set for each of the images in the NTSC format and the PAL format. As a result, the on-screen message is displayed on a television screen almost in the same size regardless of the type of the optical disc Od and the image display format.

Figure 4A:
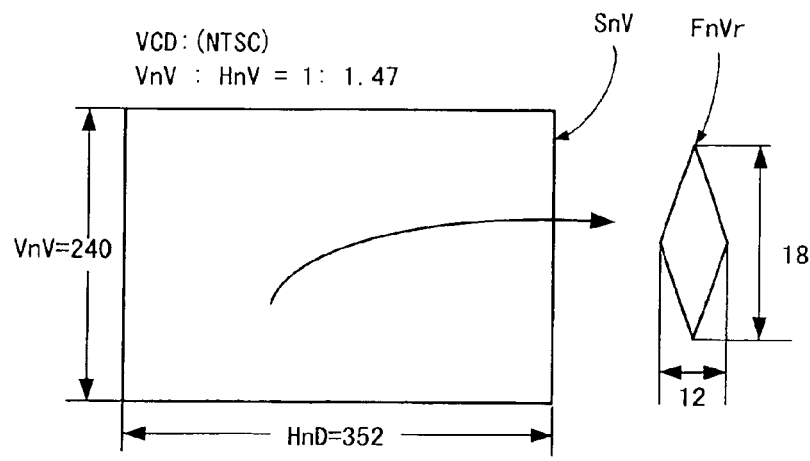
FIGS. 4A to 4C are diagrams schematically showing comparison of the font size of an on-screen message among formats of display data in NTSC, in the optical disc playback apparatus of the present invention.
Figure 4B:
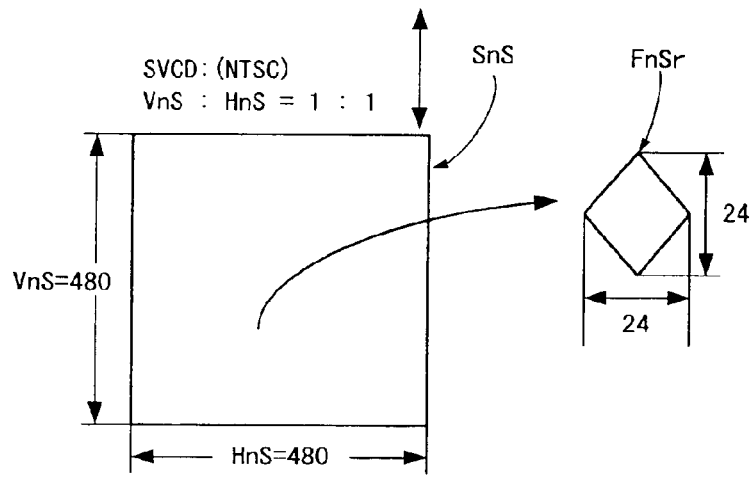
Figure 4C:
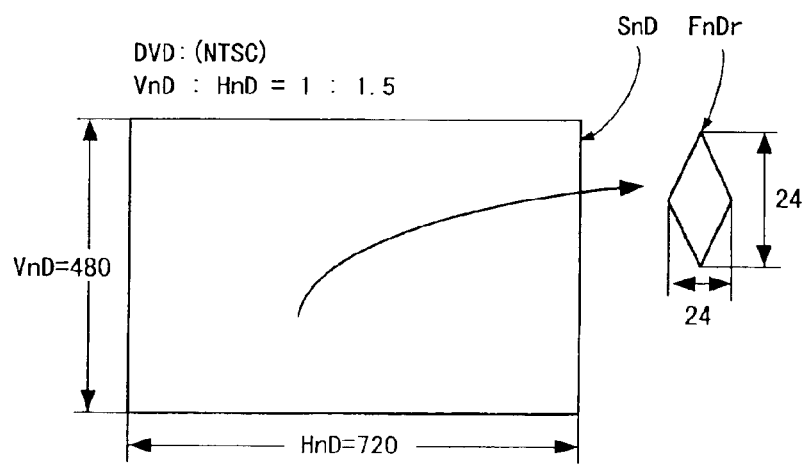
Figure 5A:
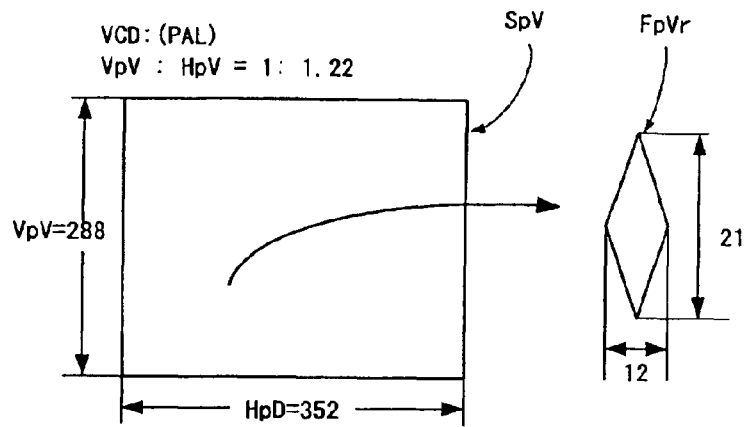
FIGS. 5A to 5C are diagrams schematically showing comparison of the font size of an on-screen message among formats of display data in PAL, in the optical disc playback apparatus of the present invention.
Figure 5B:
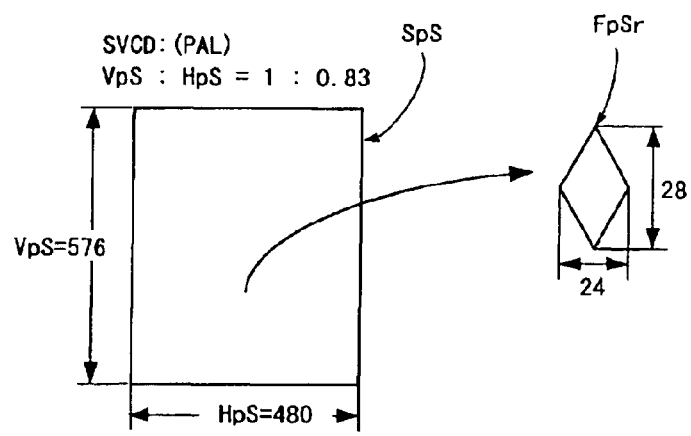
Figure 5C:
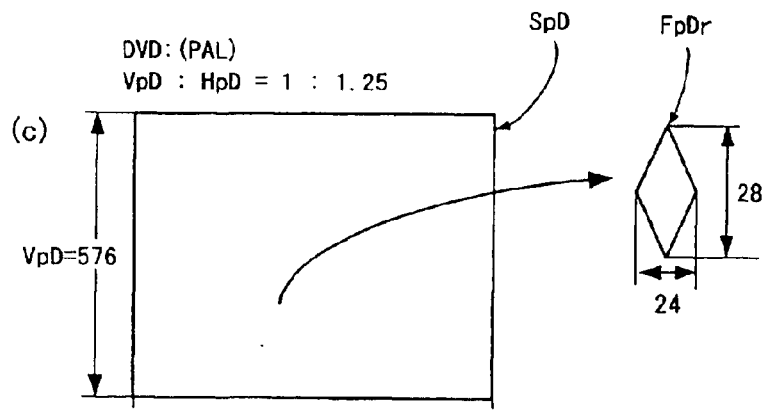

In FIGS. 4A to 4C, shown is the examples of the font of the on-screen message being displayed on the television screen in the NTSC format by the optical disc playback apparatus of the embodiment. In FIGS. 5A to 5C, shown is the examples of the font of the on-screen message being displayed on the television screen in the PAL format.

Figure 16A:
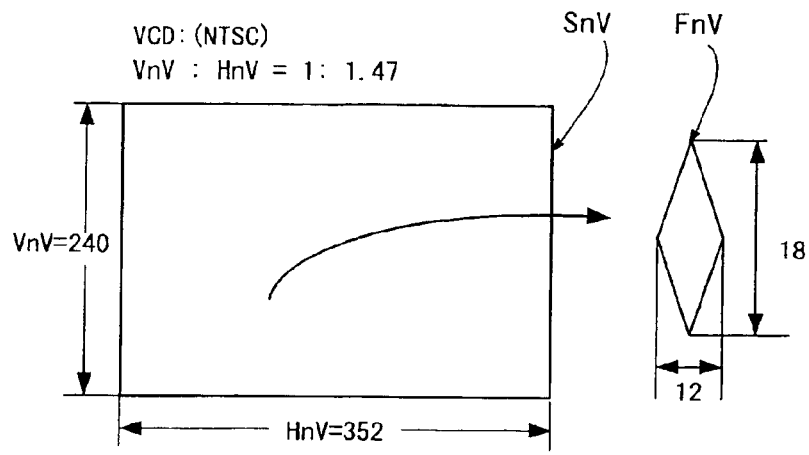
FIGS. 16A to 16C are diagrams illustrating a problem relating to a display status of the on-screen message in NTSC format, in the conventional optical playback apparatus.
Figure 16B:
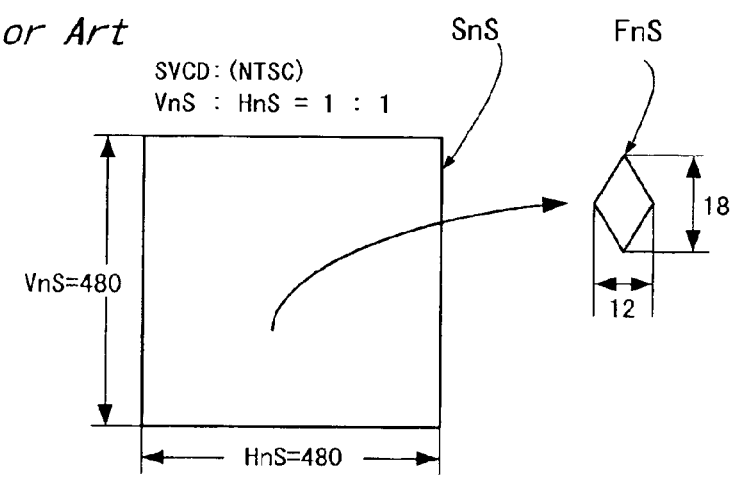
Figure 16C:
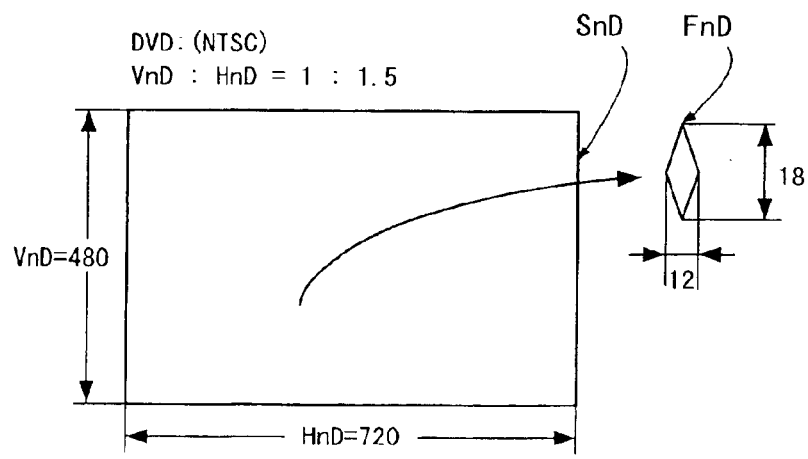

In FIGS. 4A to 4C, similarly to FIGS. 16A to 16C, the resolutions, the aspect ratios, and the resolution ratios of the NTSC image are relationally shown. In the drawings, screen displays of images are schematically shown for each type of the optical discs. All images are being displayed on the same television monitor and are equal in the vertical image size.

As shown in FIG. 4A, the resolution of the font FnVr of the on-screen message on the NTSC-VCD image screen SnV is 12 dots by 18 lines, which is unchanged from that shown in FIG. 16A.

As shown in FIG. 4B, the resolution of the font FnSr on the NTSC-SVCD image screen SnS is 24 dots by 24 lines. In this case, in comparison with the font FnS in FIG. 16B, the font FnSr is enlarged by approximately 1.3 (24/18) times vertically and by 2 (24/12) times horizontally. Therefore, the font FnSr is displayed approximately 0.7 (240/480·24/18) times smaller than the font FnV vertically and 1.5 (352/480·24/12) times larger horizontally. Consequently, the visibility of the on-screen message is improved.

As shown in FIG. 4C, the resolution of the font FnDr on the NTSC-DVD image screen SnD is 24 dots by 24 lines. In this case, in comparison with the font FnD in FIG. 16C, the font FnDr is enlarged by 1.3 (24/18) times vertically and by 2 (24/12) times horizontally. Therefore, the font FnDr is displayed approximately 0.7 (240/480·24/18) times smaller than the font FnV vertically and approximately the same (352/720·24/12) horizontally. Consequently, the visibility of the on-screen message is improved.

Figure 17A:
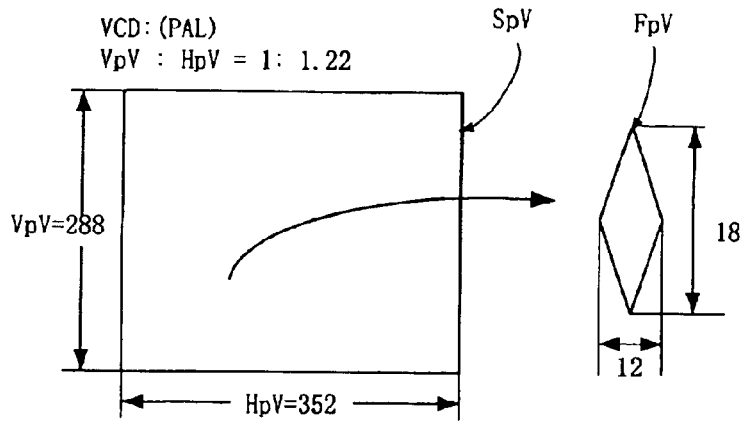
FIGS. 17A to 17C are diagrams illustrating a problem relating to a display status of the on-screen message in PAL format, in the conventional optical playback apparatus.
Figure 17B:
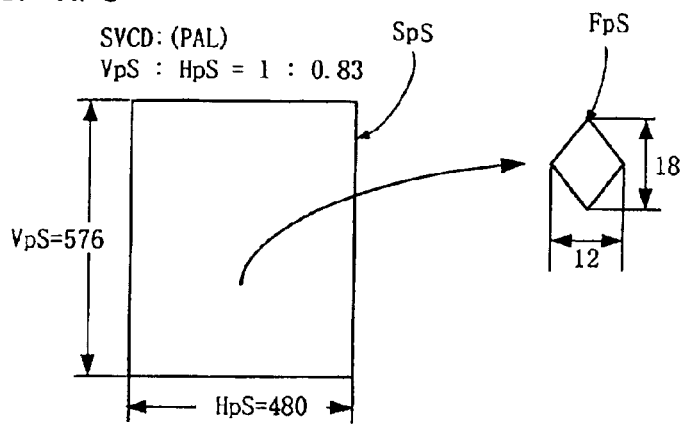
Figure 17C:
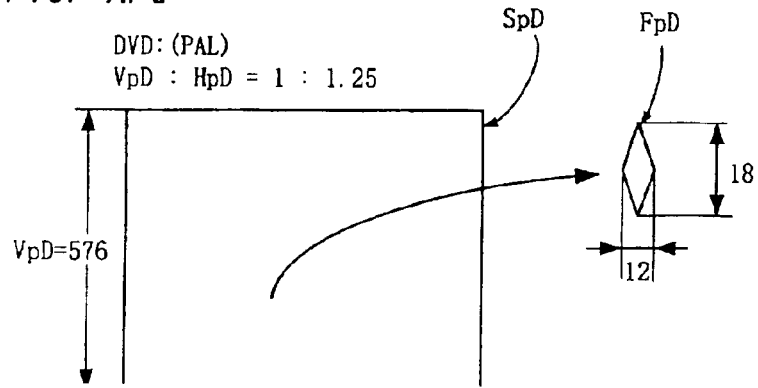

In FIGS. 5A to 5C, similarly to FIGS. 17A to 17C, the resolutions, the aspect ratios, and the resolution ratios of the PAL image are relationally shown. In the drawings, screen displays of images are schematically shown for each type of the optical discs. All images are being displayed on the same television monitor and are equal in the vertical image size.

As shown in FIG. 5A, the resolution of the font FpVr of the on-screen message on the PAL-VCD image screen SpV is 12 dots by 21 lines, which is changed from that shown in FIG. 17A. Here, the vertical resolution Rvf is enlarged by approximately 1.17 (21/18) times.

As shown in FIG. 5B, the resolution of the font FpSr on the PAL-SVCD image screen SpS is 24 dots by 28 lines. In this case, in comparison with the font FpS in FIG. 17B, the font FpSr is enlarged by 1.6 (28/18) times vertically and by 2 (24/12) times horizontally. Therefore, the font FpSr is displayed approximately 0.8 (288/576·28/18) times smaller than the font FpV vertically and approximately 1.5 (352/480·24/12) times larger horizontally. Consequently, the visibility of the onscreen message is improved.

As shown in FIG. 5C, the resolution of the font FpDr on the PAL-DVD image screen SpD is 24 dots by 28 lines. In this case, the font FpDr is displayed approximately 0.8 (288/576·28/18) times smaller than the font FpV vertically and approximately the same (352/720·24/12) horizontally. Consequently, the visibility of the on-screen message is improved.

Figure 6:
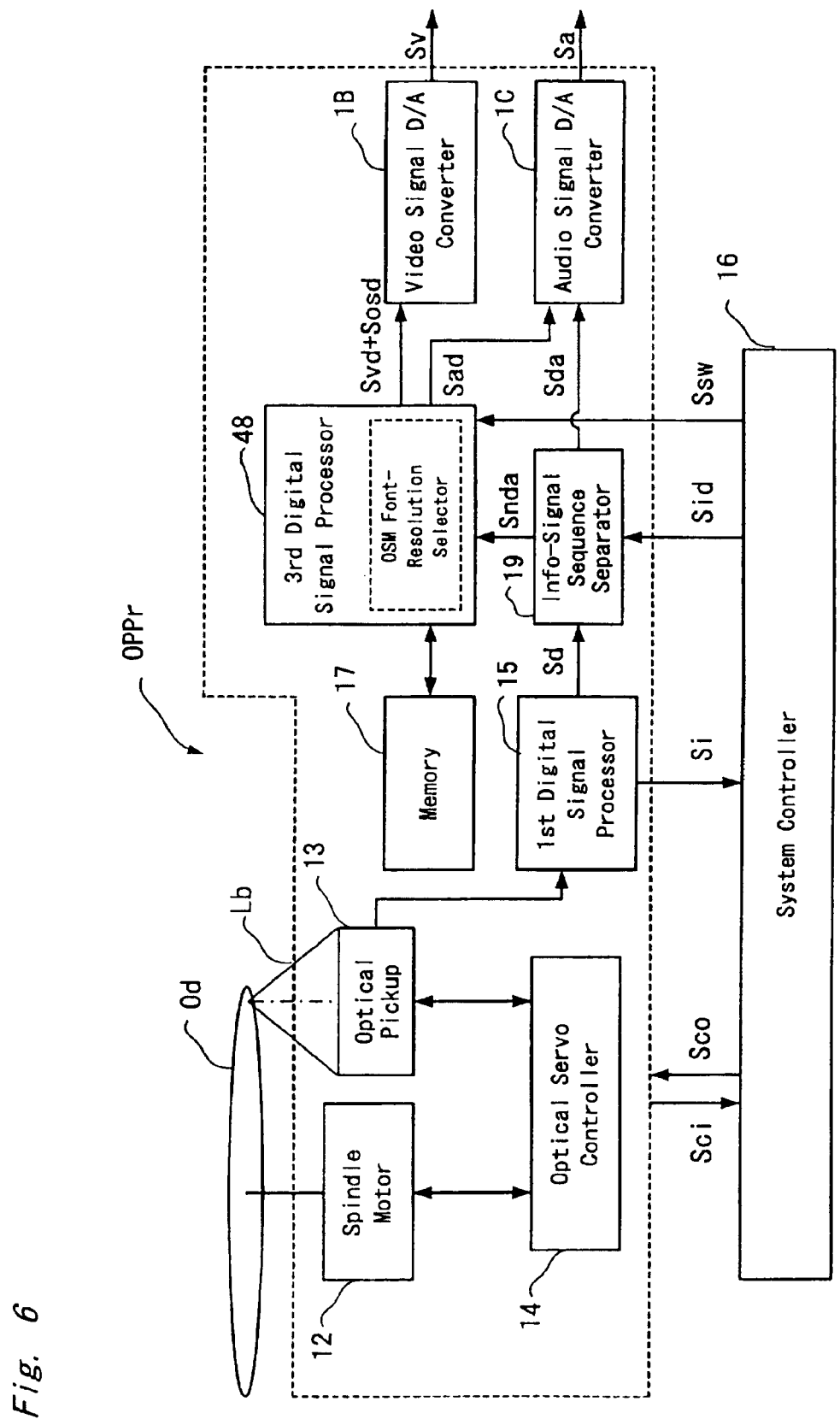
FIG. 6 is a diagram showing an alternative of the optical disc playback apparatus in FIG. 1.

By referring to FIG. 6, an alternative of the optical disc playback apparatus OPP according to the first embodiment of the present invention is described. An optical disc playback apparatus OPPr of the alternative is provided with a third digital signal processor 48, in which the second digital processor 18 and the OSM font-resolution selector 1A of the optical disc playback apparatus OPP shown in FIG. 1 are integrally constructed.

As a result, the third digital signal processor 48 outputs the decoded digital signal sequence Svd and the digital character signal sequence Sosd together to the video signal D/A converter 1B, based on the non-music CD signal sequence Snda from the information signal sequence separator 19 and the control signal Ssw from the system controller 16. The third digital signal processor 48 also outputs the CD-DA signal sequence Sad to the audio signal D/A converter 1C.

The operation of the optical disc playback apparatus OPPr is basically the same as that of the optical disc playback apparatus OPP described by referring to FIGS. 1 to 5 except for the above described operation related to the third digital signal processor 48. Therefore, the description thereof is omitted.

(Second Embodiment)

Figure 7:
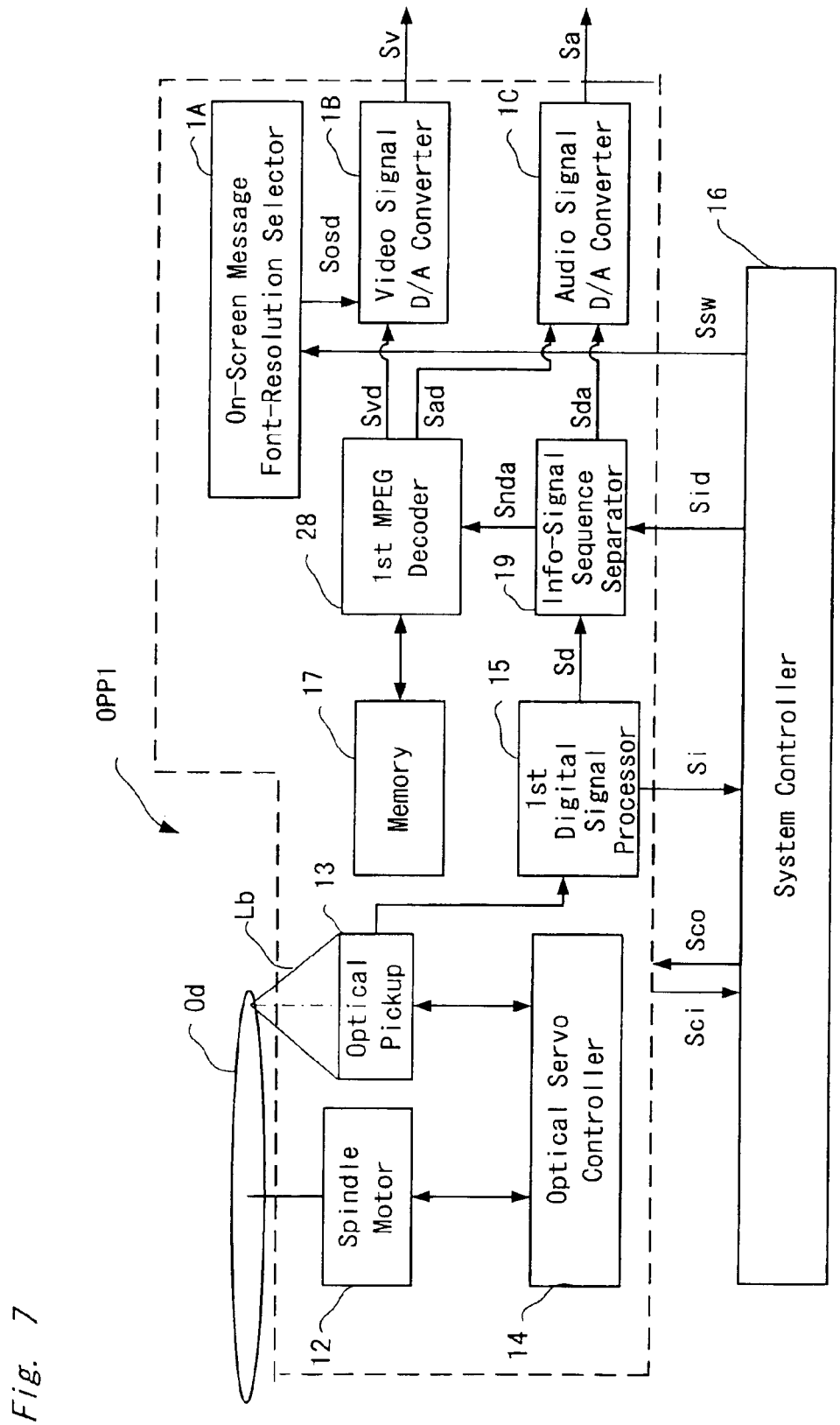
FIG. 7 is a block diagram showing the structure of an optical disc playback apparatus according to a second embodiment of the present invention.
Figure 8:
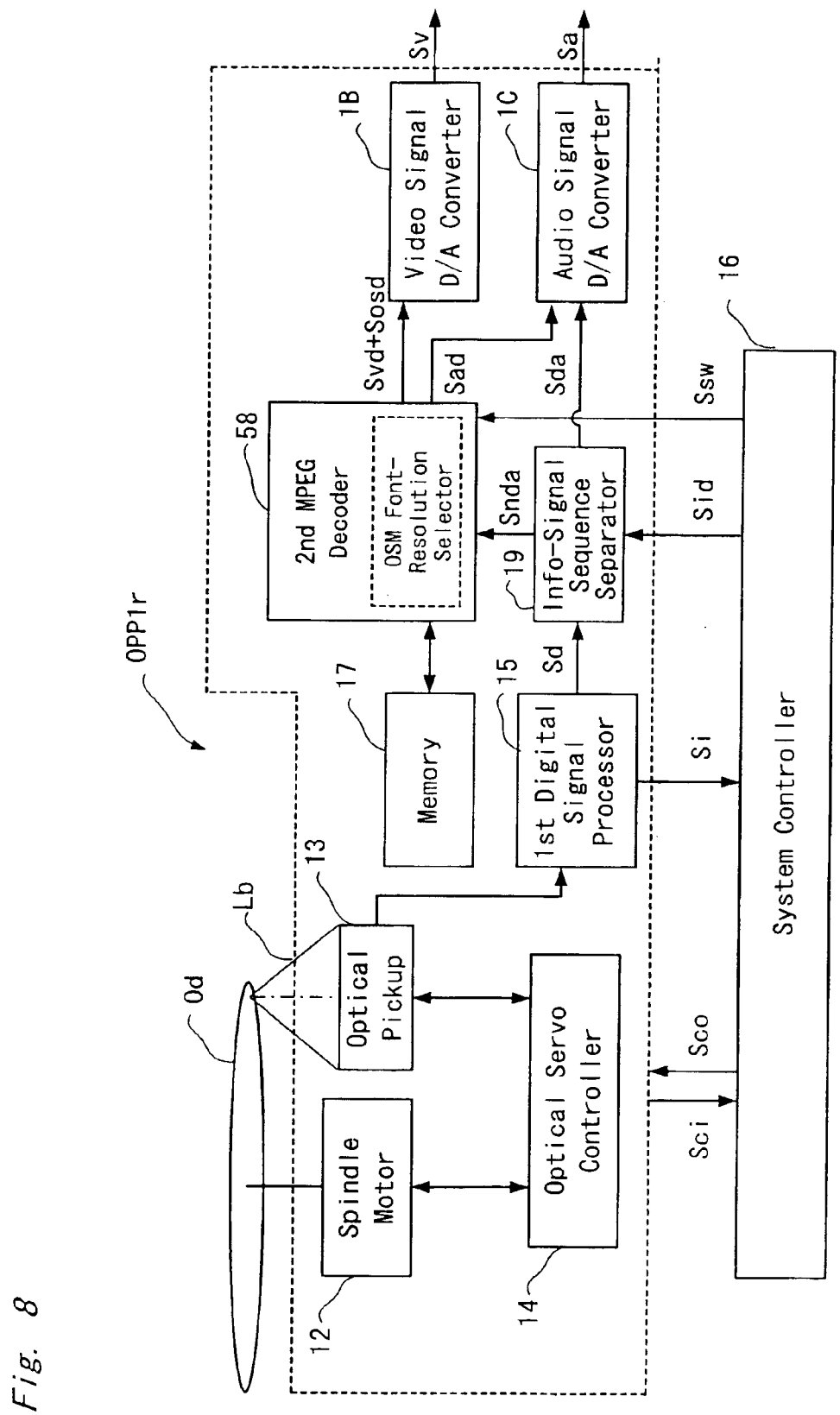
FIG. 8 is a diagram showing an alternative of the optical disc playback apparatus in FIG. 7.

Next, by referring to FIGS. 7 and 8, an optical disc playback apparatus according to a second embodiment of the present invention is described. In an optical disc playback apparatus OPP1 shown in FIG. 7, the second digital signal processor 18 in the optical disc playback apparatus OPP shown in FIG. 1 is implemented by a first MPEG1 decoder 28. The first MPEG1 decoder 28 is a device for decoding MPEG1 digital signals encoded by the MPEG1 technique to generate video data and audio data, and its basic configuration is well known.

The optical disc playback apparatus OPP1 is thus suitable for a case where the non-music signal sequence Snda recorded on the optical disc Od such as video CD or karaoke CD is the MPEG1 signal sequence.

The operation of the optical disc playback apparatus OPP1 is basically the same as that of the optical disc playback apparatus OPP described by referring to FIGS. 1 to 5 except for the operation related to the above MPEG1 decoder 28. Therefore, the description thereof is omitted. Note that the optical disc playback apparatus OPP1 of this embodiment is structurally specialized for playing back a VCD.

In FIG. 8, shown is an alternative of the optical disc playback apparatus OPP1. An optical disc playback apparatus OPP1r of the alternative is provided with a second MPEG1 decoder 58, in which the first MPEG1 decoder 28 and the OSM font-resolution selector 1A shown in FIG. 7 are integrally constructed. The second MPEG1 decoder 58 outputs the decoded digital signal sequence Svd and the digital character signal sequence Sosd together to the video signal D/A converter 1B, based on the non-music CD signal sequence Snda from the information signal sequence separator 19 and the control signal Ssw from the system controller 16. The second MPEG1 decoder 58 also outputs the CD-DA signal sequence Sad to the audio signal D/A converter 1C.

The operation of the optical disc playback apparatus OPP1r is basically the same as that of the optical disc playback apparatus OPP1 except for the above described operation related to the second MPEG1 decoder 58. Therefore, the description thereof is omitted.

(Third Embodiment)

Figure 9:
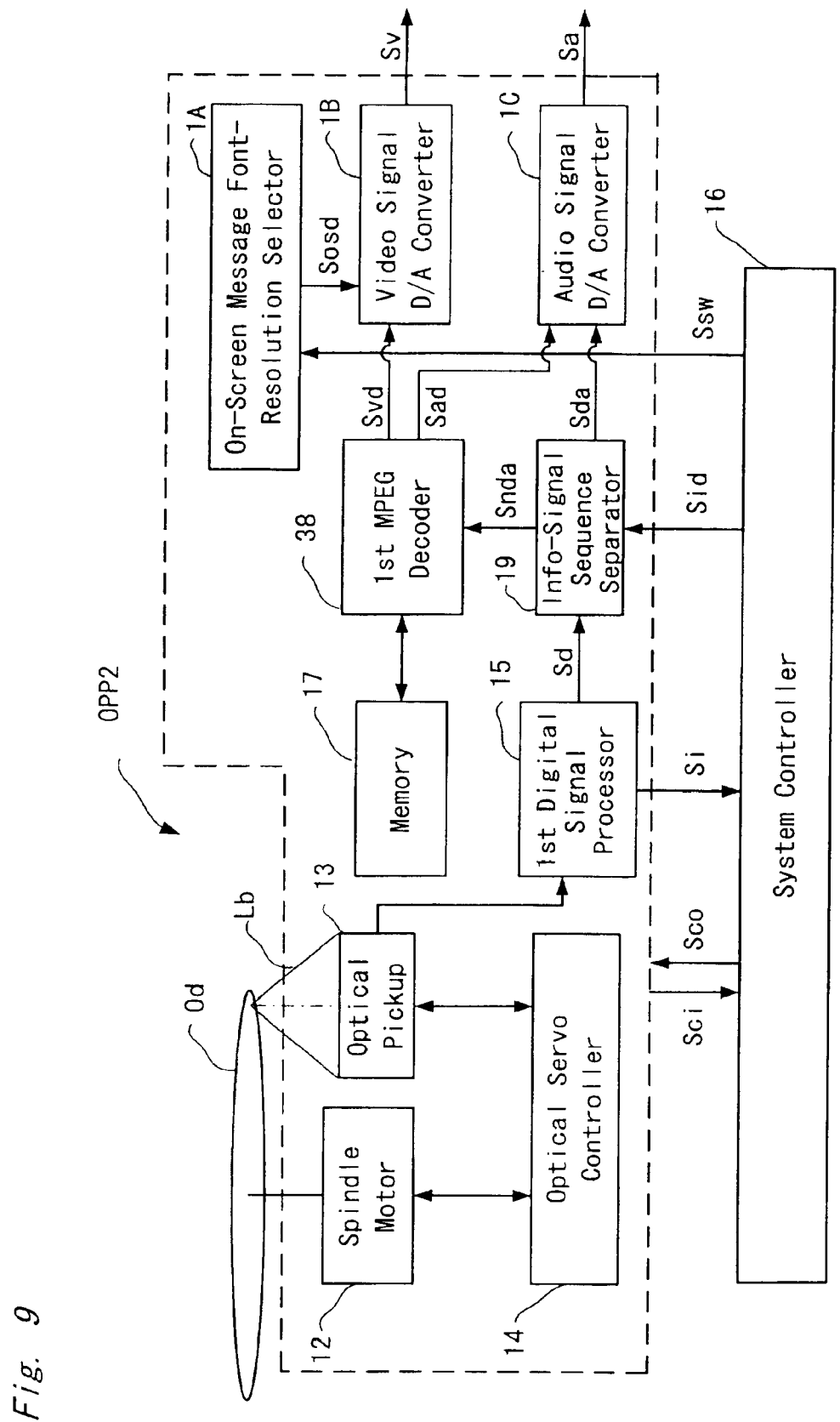
FIG. 9 is a block diagram showing the structure of an optical disc playback apparatus according to a third embodiment of the present invention.
Figure 10:
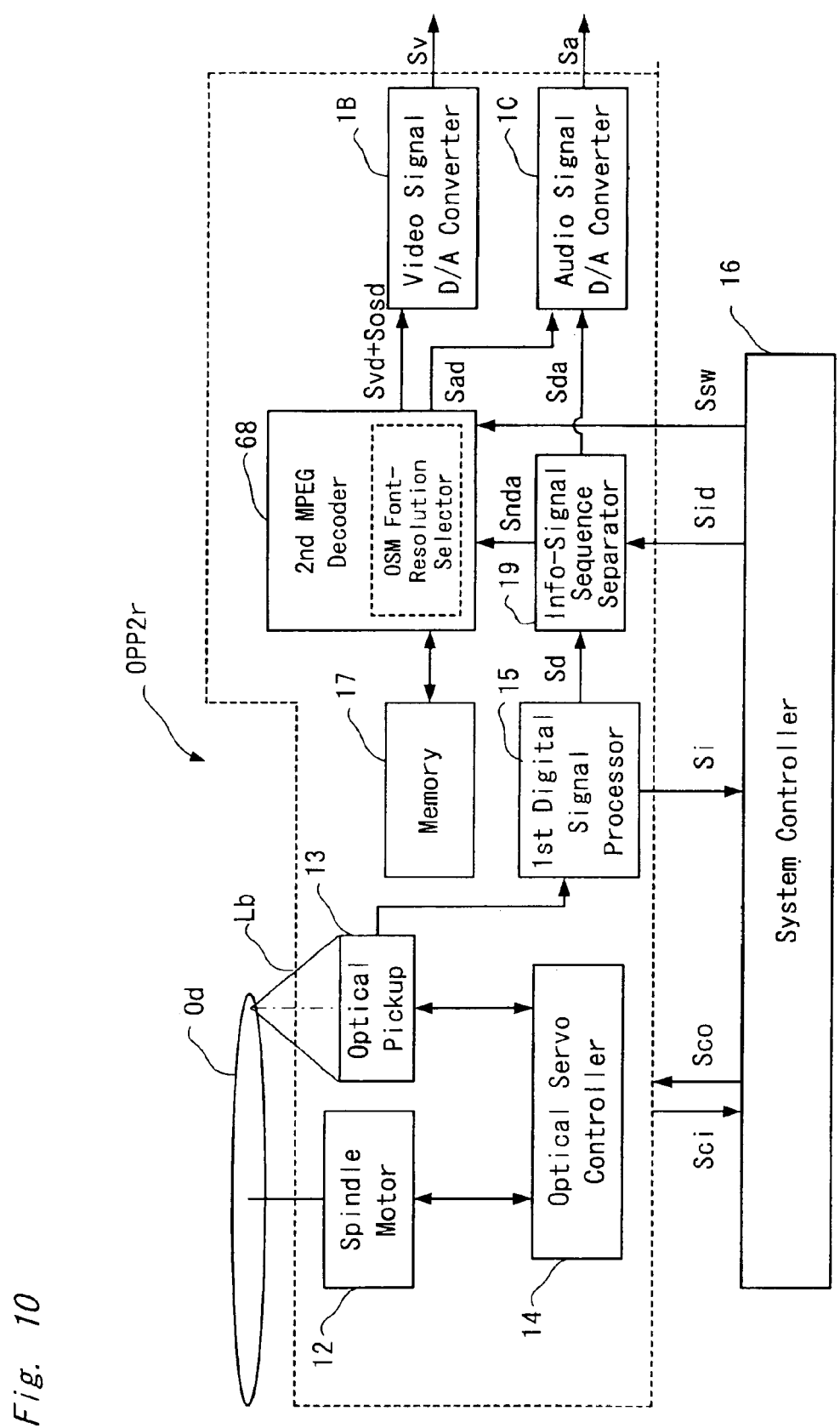
FIG. 10 is a diagram showing an alternative of the optical disc playback apparatus in FIG. 9.
Figure 11:
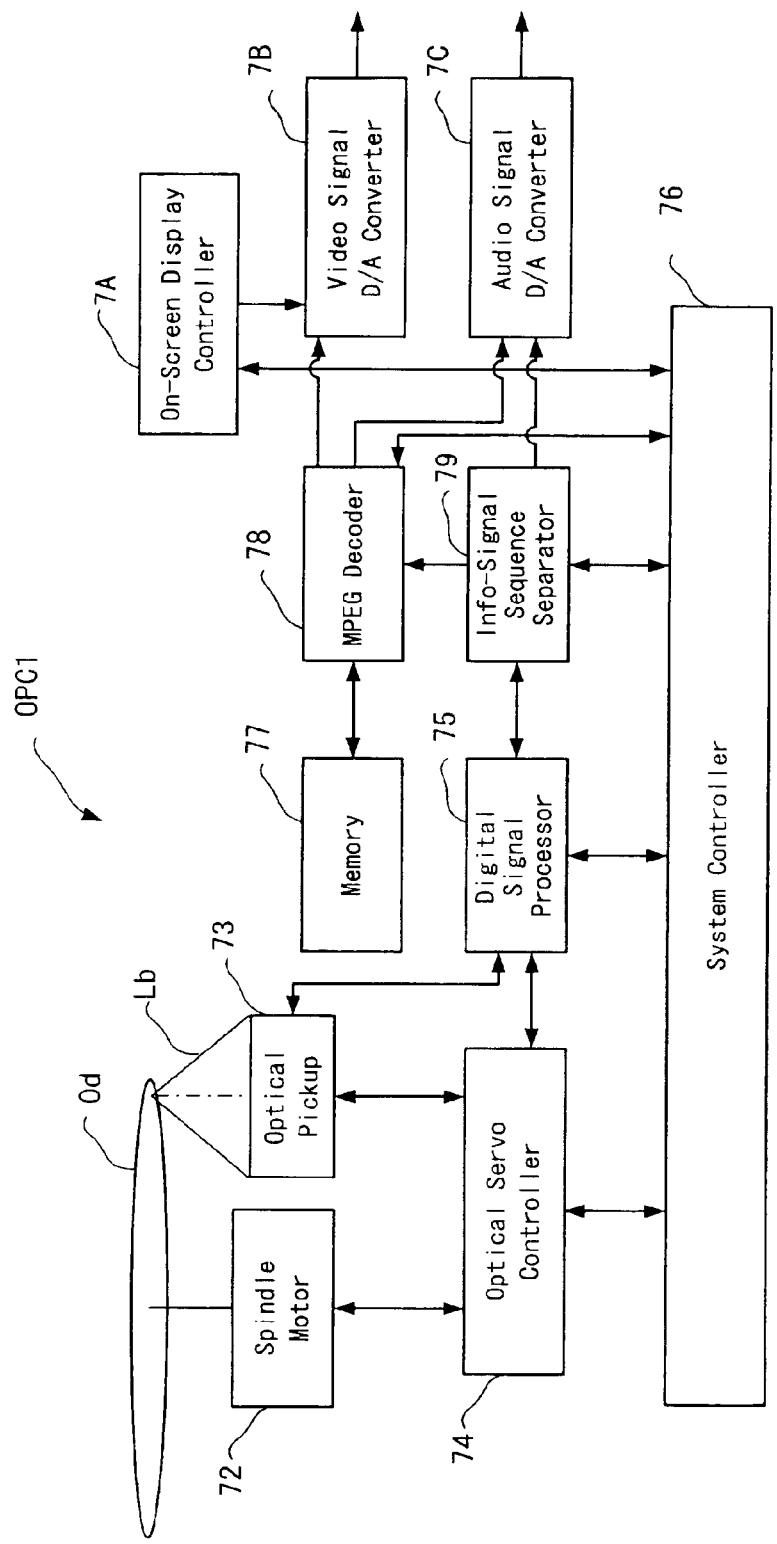
FIG. 11 is a block diagram showing an example of a conventional optical disc playback apparatus.
Figure 12:
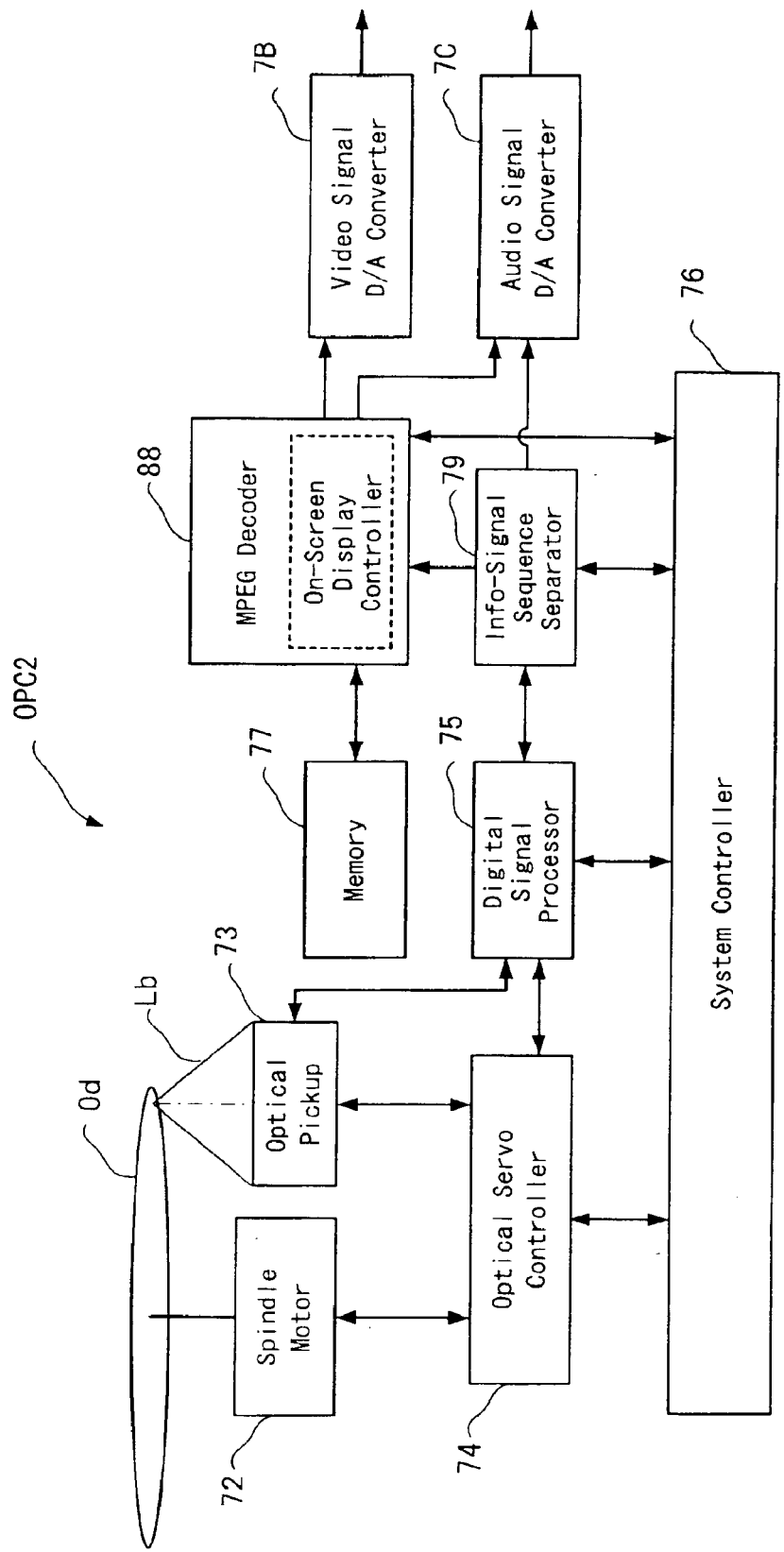
FIG. 12 is a block diagram showing an example of the conventional optical disc playback apparatus other than that shown in FIG. 11.
Figures 13, 14, 15:
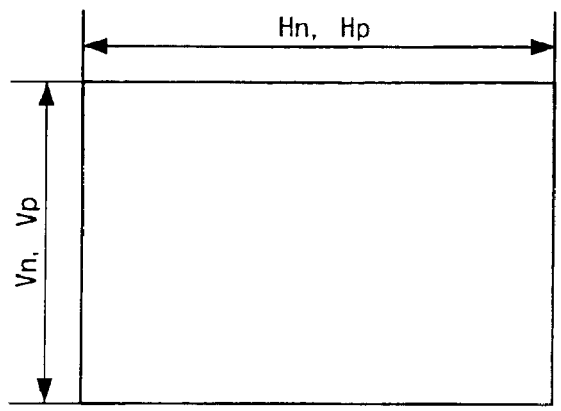
FIG. 13 is a diagram illustrating vertical and horizontal resolutions of a television image.
FIG. 14 is a table showing resolutions, aspect ratios, and resolution ratios for each type of an optical disc in NTSC format.
FIG. 15 is a table showing resolutions, aspect ratios, and resolution ratios for each type of an optical disc in PAL format.

Next, by referring to FIGS. 9 and 10, an optical disc playback apparatus according to a third embodiment of the present invention is described. An optical disc playback apparatus OPP2 shown in FIG. 9 is provided with a first MPEG2 decoder 38 as an alternative to the first MPEG1 decoder 28 shown in FIG. 7. The first MPEG2 decoder 38 is a device for decoding MPEG2 digital signals encoded by the MPEG2 technique to generate video data and audio data, and its basic configuration is well known.

The optical disc playback apparatus OPP2 is thus suitable for a case where the non-music signal sequence Snda recorded on the optical disc Od such as CVD, SVCD or DVD is the MPEG2 signal sequence.

The operation of the optical disc playback apparatus OPP2 is basically the same as that of the optical disc playback apparatus OPP1 except for the operation related to the first MPEG2 decoder 38.

FIG. 10 shows an alternative of the optical disc playback apparatus OPP2. An optical disc playback apparatus OPP2r of the alternative is provided with a second MPEG2 decoder 68, in which the first MPEG2 decoder 38 and the OSM font-resolution selector 1A shown in FIG. 9 are integrally constructed.

The second MPEG2 decoder 68 outputs the decoded digital signal sequence Svd and the digital character signal sequence Sosd together to the video signal D/A converter 1B, based on the non-music CD signal sequence Snda from the information signal sequence separator 19 and the control signal Ssw from the system controller 16. The second MPEG2 decoder 68 also outputs the CD-DA signal sequence Sad to the audio signal D/A converter 1C.

The operation of the optical disc playback apparatus OPP2r is basically the same as that of the optical disc playback apparatus OPP2 except for the operation related to the second MPEG2 decoder 68.

As described in the foregoing, the optical disc playback apparatus of the present invention can playback an arbitrary optical disc Od if the second digital signal processor 18 shown in FIG. 1 is implemented by a device capable of decoding digital data recorded thereon.

While the invention has been described in detail, the foregoing description is in all aspects illustrative and not restrictive. It is understood that numerous other modifications and variations can be devised without departing from the scope of the invention.

What is claimed is:

1. An optical disc playback apparatus for reproducing data to be reproduced from an optical disc of a plurality of kinds of optical discs, the optical disc having data recorded thereon in one of a plurality of different display formats, and for outputting an on-screen message composed of a character font (hereinafter referred to as font), said apparatus comprising:

a disc detection system operable to detect a media type of the optical disc;

a reader operable to read the recorded data, which includes the data to be reproduced and information related to the display format of the data to be reproduced, from a recording surface of the optical disc;

an on-screen message generator operable to generate a digital character signal sequence to be displayed as the on-screen message; and an on-screen message font-resolution selector operable to control said on-screen message generator to set a resolution of the font to a value dependent on the media type of the optical disc and to scale the font by a value dependent on the display format of the data to be reproduced.

2. The optical disc playback apparatus as claimed in claim 1, further comprising:

an optical disc determination system operable to determine a type of the optical disc based on the read recorded data, wherein said on-screen message font-resolution selector is further operable to control said on-screen message generator to set the resolution of the font to 12 dots by 18 lines when the optical disc is determined to be a music CD.

3. The optical disc playback apparatus as claimed in claim 2, further comprising:

a display format determination system operable to determine a display format of the data to be reproduced based on the read recorded data, wherein said on-screen message font-resolution selector is further operable to control said on-screen message generator to set the resolution of the font to a first standard resolution when the optical disc is determined to be a disc other than a music CD and when the display format of the data to be reproduced is determined to be NTSC.

4. The optical disc playback apparatus as claimed in claim 3, wherein said on-screen message font-resolution selector is further operable to control said on-screen message generator to set the resolution of the font to a second standard resolution by multiplying the first standard resolution by a predetermined scaling factor when the optical disc is determined to be a disc other than a music CD and when the display format of the data to be reproduced is determined to be PAL.

5. The optical disc playback apparatus as claimed in claim 4, wherein the predetermined scaling factor is 1.2.

6. The optical disc playback apparatus as claimed in claim 3, wherein the first standard resolution is set to 12 dots by 18 lines when the optical disc is determined to be a video CD.

7. The optical disc playback apparatus as claimed in claim 3, wherein the first standard resolution is set to 24 dots by 24 lines when the optical disc is determined to be any one of an SVCD or DVD.

8. The optical disc playback apparatus as claimed in claim 2, further comprising:

a display format determination system operable to determine a display format of the data to be reproduced based on the recorded data, wherein said on-screen message font-resolution selector is further operable to control said on-screen message generator to set the resolution of the font to a predetermined standard resolution when the optical disc is determined to be a disc other than the music CD and when the display format of the data to be reproduced is determined to be PAL.

9. The optical disc playback apparatus as claimed in claim 8, wherein the predetermined standard resolution is set to 12 dots by 21 lines when the optical disc is determined to be a video CD.

10. The optical disc playback apparatus as claimed in claim 8, wherein the predetermined standard resolution is set to 24 dots by 28 lines when the optical disc is determined to be any one of an SVCD or DVD.

11. The optical disc playback apparatus as claimed in claim 2, wherein said optical disc determination system is operable to determine the type of the optical disc based on a control bit of a TOC included in the recorded data.

12. The optical disc playback apparatus as claimed in claim 8, wherein said display format determination system is operable to determine the display format of the data to be reproduced based on a sequence header included in the recorded data.

13. The optical disc playback apparatus as claimed in claim 1, further comprising:

a signal sequence separator operable to separate a first music CD signal sequence and a non-music CD signal sequence which is a signal sequence other than the first music CD signal sequence, from the recorded data;

a digital signal processor operable to convert video signals included in the separated non-music CD signal sequence into a decoded digital signal sequence and to convert audio data included in the non-music CD signal sequence to a second music CD signal sequence;

a video signal converter operable to convert the decoded digital signal sequence and the digital character signal sequence into analog video signals; and an audio signal converter operable to convert the first music CD signal sequence and the second music CD signal sequence into analog audio signals.

14. The optical disc playback apparatus as claimed in claim 13, wherein said digital signal processor is operable to decode an MPEG1 signal sequence.

15. The optical disc playback apparatus as claimed in claim 13, wherein said digital signal processor is operable to decode an MPEG2 signal sequence.

16. An optical disc playback method for reproducing data to be reproduced that is included in data recorded on an optical disc and outputting an on-screen message to be displayed in a character font of a predetermined resolution, said method comprising:

detecting a media type of the optical disc;

reading recorded data, which includes information related to a display format of the data to be reproduced, from a recording surface of the optical disc;

generating a digital character signal sequence to be displayed as the on-screen message; and setting a resolution of the character font based on the detected media type and scaling the character font by a value based on the display format.

* * * * *